US009826437B2

(12) United States Patent
Roeland et al.

(10) Patent No.: US 9,826,437 B2
(45) Date of Patent: Nov. 21, 2017

(54) METHODS AND APPARATUS FOR RELOCATING PACKET PROCESSING FUNCTIONS

(71) Applicant: Telefonaktiebolaget L M Ericsson (publ), Stockholm (SE)

(72) Inventors: Dinand Roeland, Sollentuna (SE); Gunnar Mildh, Sollentuna (SE); Rashmi Purushothama, Sundbyberg (SE); Johan Rune, Lidingö (SE); Zoltán Turányi, Szentendre (HU)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/765,677

(22) PCT Filed: Jan. 12, 2015

(86) PCT No.: PCT/EP2015/050380
§ 371 (c)(1),
(2) Date: Aug. 4, 2015

(87) PCT Pub. No.: WO2016/112948
PCT Pub. Date: Jul. 21, 2016

(65) Prior Publication Data
US 2016/0309369 A1    Oct. 20, 2016

(51) Int. Cl.
*H04W 36/00* (2009.01)
*H04L 12/813* (2013.01)
(Continued)

(52) U.S. Cl.
CPC ......... *H04W 36/0011* (2013.01); *H04L 47/20* (2013.01); *H04W 36/08* (2013.01); *H04W 84/042* (2013.01)

(58) Field of Classification Search
CPC .......... H04W 36/0011; H04W 84/042; H04W 36/08; H04L 47/20
See application file for complete search history.

(56) References Cited

U.S. PATENT DOCUMENTS

| 9,706,472 B2 | 7/2017 | Roeland et al. |
| 2010/0027497 A1* | 2/2010 | Pelletier ................ H04W 28/06 370/329 |

(Continued)

FOREIGN PATENT DOCUMENTS

| EP | 2835953 A1 | 2/2015 |
| WO | 2014032233 A1 | 3/2014 |

OTHER PUBLICATIONS

Bifulco et al., "Scalability of a Mobile Cloud Management System", Mobile Cloud Computing, ISBN 978-1-4503-1519-7 Aug. 2012, pp. 17-22.

(Continued)

*Primary Examiner* — Mohammad Anwar
(74) *Attorney, Agent, or Firm* — Rothwell, Figg, Ernst & Manbeck, P.C.

(57) ABSTRACT

The invention relates to a method for relocating a first function for processing data packets of a flow associated with a device, from a source to a target instance. The method is triggered by an initiated relocation of a second function for processing data packets of the flow. The method comprises initiating (710) a first phase of a relocation method for relocating the first function, before the relocation of the second function is finalized. The method also comprises determining (720) whether to initiate a second phase of the relocation method based on information related to a progress of the relocation of the second function. When it is determined (720) to initiate the second phase, the method further comprises initiating (730) the second phase of the relocation (Continued)

method comprising the resumption of the processing of the data packets of the flow at the target instance of the first function.

49 Claims, 21 Drawing Sheets

(51) Int. Cl.
*H04W 36/08* (2009.01)
*H04W 84/04* (2009.01)

(56) References Cited

U.S. PATENT DOCUMENTS

| | | | |
|---|---|---|---|
| 2010/0085962 A1* | 4/2010 | Issaeva | H04W 76/041 370/355 |
| 2013/0012192 A1 | 1/2013 | Xi et al. | |
| 2014/0259012 A1 | 9/2014 | Nandlall et al. | |
| 2014/0280898 A1 | 9/2014 | Voit et al. | |

OTHER PUBLICATIONS

Elisa Maini et al., "A Compositional Modelling Approach for Live Migration in Software Defined Networks", IEEE, 2014 International Conference and Workshop on the Network of the Future (NOF), XP032783623, Dec. 2014, 6 pages.
Georg Hampel et al., "Applying Software-Defined Networking to the Telecom Domain", IEEE, 16th IEEE Global Internet Symposium, XP032436447, Apr. 2013, pp. 133-138.
Luca Valtulina et al., "Performance Evaluation of a SDN/OpenFlow-Based Distributed Mobility Management (DMM) Approach in Virtualized LTE Systems", Globecom 2014 Workshop—Cloud Computing Systems, Networks, and Applications, ISBN: 978-1-4799-7470-2, Dec. 2014, pp. 18-23.
International Search Report and Written Opinion issued in corresponding International Application No. PCT/EP2015/050380 dated Sep. 28, 2015, 11 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.1.0, Dec. 2014, 310 pages.
3GPP, 3rd Generation Partnership Project; Technical Specification Group Services and System Aspects; Architecture enhancements for non-3GPP accesses (Release 13), 3GPP TS 23.402 V13.0.0, Dec. 2014, 290 pages.
Non-final Office Action issued in U.S. Appl. No. 14/421,579, dated Oct. 17, 2016, 12 pages.
Reply to Non-Final Office Action filed in U.S. Appl. No. 14/421,579 dated Jan. 17, 2017, 19 pages.
Taleb, T., et al., "Follow-Me Cloud: An Open Flow-based Implementation", 2013 IEEE International Conference on Green Computing and Communications and IEEE Internet of Things and IEEE Cyber, Physical and Social Computing, IEEE, Aug. 20, 2013, pp. 240-245, XP032530729.
International Search Report and Written Opinion dated Jul. 16, 2015 in International application No. PCT/EP2014/078307, 9 pages.
Notice of Allowance issued in U.S. Appl. No. 14/421,579, dated Mar. 14, 2017, 12 pages.

* cited by examiner

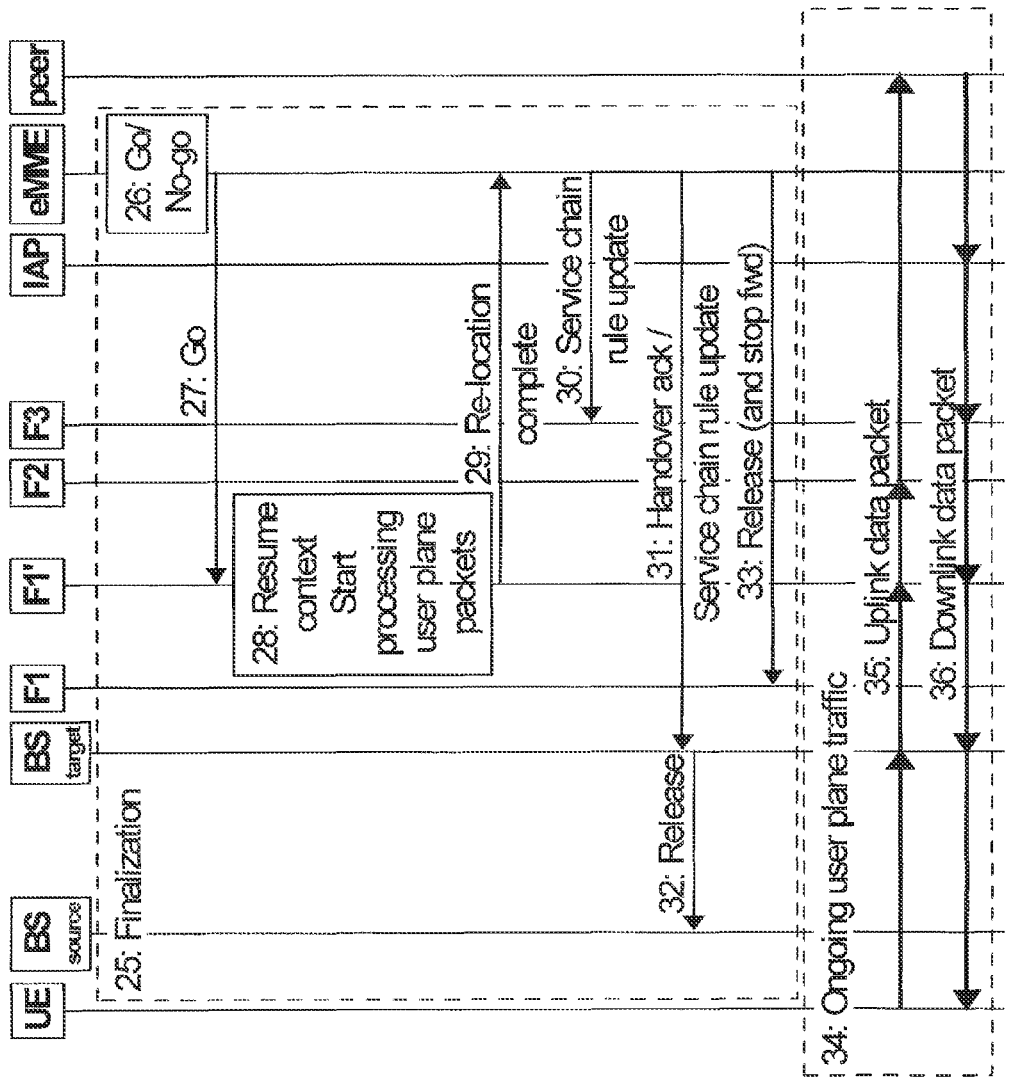
Fig. 6a"

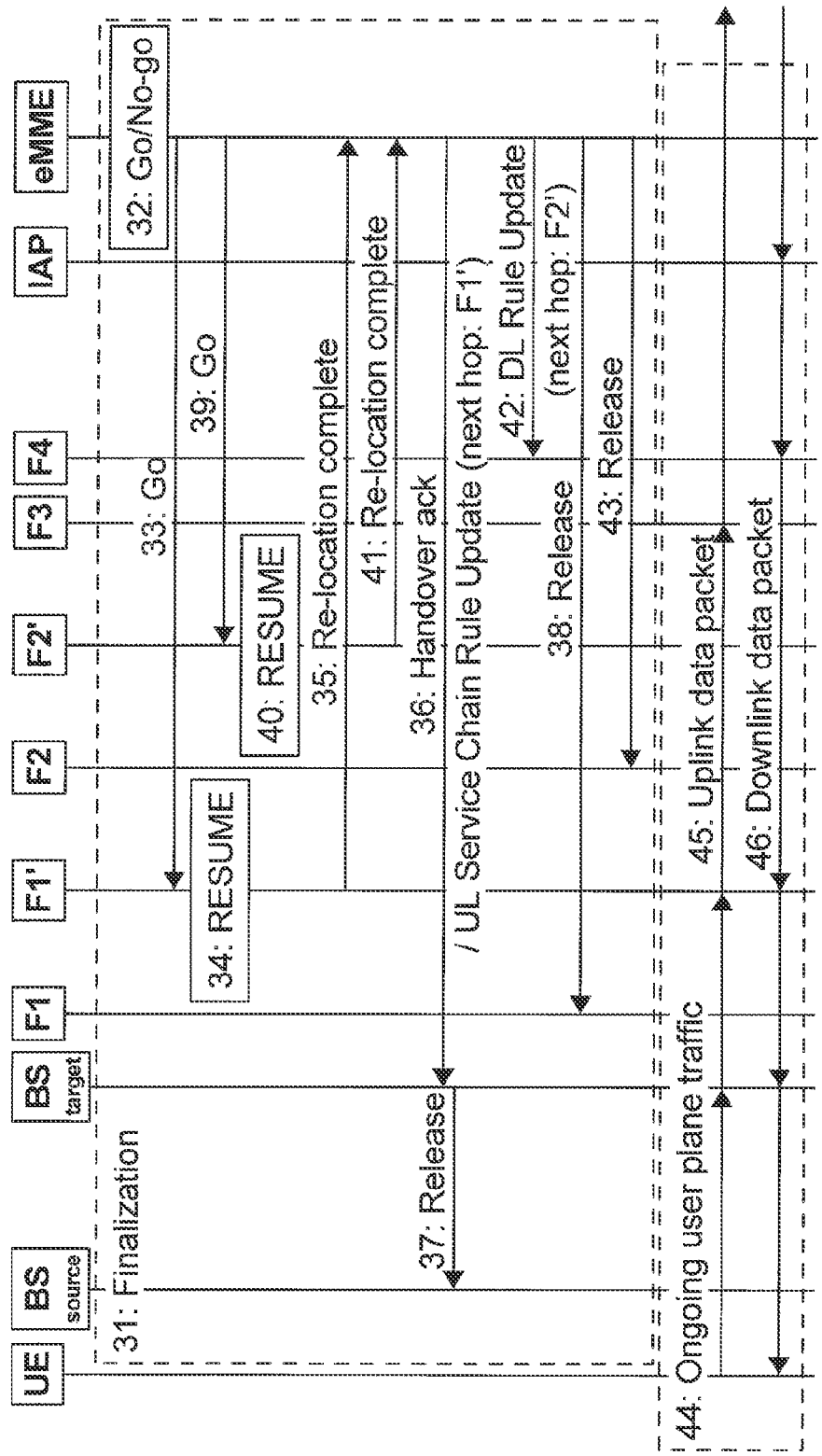
Fig. 6c"

METHODS AND APPARATUS FOR RELOCATING PACKET PROCESSING FUNCTIONS

CROSS REFERENCE TO RELATED APPLICATION(S)

This application is a 35 U.S.C. §371 National Phase Entry Application from PCT/EP2015/050380, filed Jan. 12, 2015, the disclosure of which is incorporated by reference.

TECHNICAL FIELD

The disclosure relates to relocation of functions for processing data packets. The disclosure relates more specifically to methods and apparatus for enabling relocation of functions for processing data packets of a flow associated with a device.

BACKGROUND

Long Term Evolution (LTE) is the fourth-generation (4G) wireless communication technologies standard developed within the $3^{rd}$ Generation Partnership Project (3GPP) to improve the Universal Mobile Telecommunication System (UMTS) standard. The Evolved Universal Terrestrial Radio Access Network (E-UTRAN) is the RAN of an LTE system. In an E-UTRAN, a User Equipment (UE) is wirelessly connected to a Base Station (BS) commonly referred to as an evolved NodeB (eNodeB or eNB) in LTE. A BS is a general term for a network node capable of transmitting radio signals to a wireless device and receiving signals transmitted by the wireless device.

System Architecture Evolution (SAE) is the core network architecture of 3GPP's LTE wireless communication standard. The SAE has a flat, all-Internet Protocol (IP) architecture with separation of control plane and user plane/data traffic. The main component of the SAE architecture is the Evolved Packet Core (EPC), also known as SAE Core. Some important subcomponents of the EPC are Mobility Management Entity (MME) which is the key control node for the LTE access-network, Serving Gateway (SGW) which routes and forwards user data packets, Packet data network Gateway (PGW) providing connectivity from the UE to external packet data networks by being the point of exit and entry of traffic for the UE and acting as the mobility anchor for the user plane during inter-eNodeB handovers and as the anchor for mobility between LTE and other 3GPP technologies, and Home Subscriber Server (HSS) which is a central database that contains user-related and subscription-related information.

A communications network, which may be a wireless communication network, can be viewed in many ways. One way is a deployment view, where deployment refers to the physical placement of network equipment. Equipment is placed at sites. FIG. 1a shows such sites and how they may be connected.

End user devices are not illustrated in FIG. 1a. However, a device may be connected to the network, e.g., via a base station illustrated by an antenna icon, via a small cell and distributed radio (DR), or via a fixed line or a WiFi link illustrated in the FIG. 1a by a house icon or an office icon. Traffic is carried through an aggregation network, where Ac in the FIG. 1a is used for access sites and Ag is used for aggregation sites. Access and aggregations sites are often called hub sites or central office sites. Further aggregation may be done through a backbone network (BB) towards centralized data centers (DC). Some of these data centers may also act as a primary site (P). Some data centers, illustrated as the globe icons in FIG. 1a, may also do peering towards external Internet. It should be noted that site naming is not standardized and may differ between operators. The naming above is just one example.

The deployment may be visualized in another way, illustrated in FIG. 1b. Different network services are mapped to different sites in this view. The services are here the network nodes of the 3GPP Evolved Packet Core (EPC) architecture as defined in the 3GPP standard (TS 23.401). Local sites may host antennas and eNBs. Regional sites are mainly used for aggregation. National sites host core network nodes like MME, SGW, PGW and Policy and Charging Control Function (PCRF). Some national sites may act as primary sites hosting user subscription information in a HSS.

To give an example, a large operator with more than 100 million subscribers spanning a large country may have 50000 BS sites, 150 central office sites, 25 regional data centers and 5 national data centers where each national data center also does peering towards external Internet. A BS site spans a couple of thousands of end users in a city district, a central office site spans a larger city, a regional data center spans a few million users in a part of a large state or in a number of small states, and a national data center spans tens of millions of users in a complete region of the country.

The current 3GPP EPC architecture is an anchored architecture. This means that all traffic of an Access Point Name (APN) of a user device needs to pass through one and the same PGW. With such architecture and a deployment as described above, it will be clear that the traffic in the network will follow a topological tree structure. The leaves of the tree are the end devices, the branches are the local and regional sites, and the trunk is the national data center hosting the PGW. Traffic from one end device to another end device will have to pass at least one, sometimes even two, PGWs. This also means that there may be a large latency in the transport of the packets, even if the two end devices are physically close to each other. The PGW may be hosted in a national data center physically far from the end devices. This applies also when one of the devices is located in another network, e.g. a server on the Internet.

IP networks use address aggregation to achieve routing scalability. This results in IP addresses having location significance in the network. That is, when a device with an IP address moves, it is not easy to reflect the change of the location of its IP address in the routing system. This is usually solved by allocating a fixed-location anchor point to the device managing its IP address. The anchor would then tunnel the traffic incoming to the device to the current location of the device. Mobile IP or General Packet Radio Service (GPRS) Tunneling Protocol (GTP) are protocols doing this. In the following, the place in the network topology where the IP address of the device is advertised is called an IP Advertisement Point (IAP). In today's mobile and fixed networks the IAP of the end user device, sometimes referred to as the UE, is typically anchored in a node as already mentioned above. In an anchored architecture, the IAP acts as anchor and is located in e.g. the PGW or a Broadband Network Gateway (BNG) for as long as the UE is using that IP address. The UE may e.g. use the IP address until the UE detaches or the IP address is released or re-assigned e.g. using Dynamic Host Configuration Protocol (DHCP).

All incoming traffic to the UE needs to go through the IAP, meaning the placement of the IAP in relation to the UE and its communication peer will determine how optimal the packet routing will be towards the UE. I.e. if the IAP is placed close to the UE, traffic from different sources can take a fairly optimal route to the IAP and the UE, if the IAP is far away from the UE, e.g. located on some core site, the traffic routing will often be less optimal. The drawback though of placing the IAP more distributed, i.e. closer to the UE, appears when the devices such as a wireless UE moves in the network. At that time the routing, although initially optimal, could become sub-optimal after some UE mobility. This is illustrated in the FIGS. 2a-d. In FIG. 2a, the IAP is placed in a central location. Routing of IP flow 1 is optimal but routing of IP flow 2 is sub-optimal. In FIG. 2b, the IAP is placed in a distributed location, leading to more efficient routing for both flows in the static case, i.e. when the UE is not moving. However, in FIG. 2c the IAP is also placed in a distributed location, leading to less efficient routing for both flows in the case of a mobile UE, and in FIG. 2d, the IAP is again placed in a central location, which in the mobility case leads to a more efficient routing for both flows in this example.

FIGS. 2a-2d thus illustrates how the placement of the anchor point or the IAP can support optimized routing. Moving an anchor is not possible. However, multiple IAPs may announce the same IP address. In such anchorless setup, optimized routing can be achieved by using that IAP that is on the optimal routing path. There may be one or more functions for processing data packets of a flow associated with a device or UE which are on the routing path UE-IAP-peer. If the data packets of the flow after movement of the UE start to go through a different path, and possibly via a different IAP, then those functions may still be on a sub-optimal routing path. A mechanism is needed to address that problem. Hereinafter, the term functions for processing data packets is equivalent to the term user plane packet processing functions sometimes simply referred to as packet processing functions. Examples of packet processing functions are firewall, Network Address Translation (NAT), charging functions, policy functions, and lawful interception function.

SUMMARY

It is therefore an object to address some of the problems outlined above, and to provide an efficient solution for relocation of two or more functions for processing data packets of a flow associated with a device. This object and others are achieved by the methods and apparatus according to the independent claims, and by the embodiments according to the dependent claims.

In accordance with a first aspect, a method for relocating a first function for processing data packets of a flow associated with a device is provided. The first function is relocated from a source instance to a target instance. The method is performed in an arrangement of a communication network controlling the first function for processing data packets. The method is triggered by an initiated relocation of a second function for processing data packets of the flow. The method comprises initiating a first phase of a relocation method for relocating the first function. The first phase comprises stopping the processing of the data packets at the source instance of the first function and preparing resumption of the processing at the target instance of the first function. The first phase is initiated before the relocation of the second function is finalized. The method also comprises determining whether to initiate a second phase of the relocation method finalizing the relocation of the first function, when the first phase is completed. The determining is based on information related to a progress of the relocation of the second function. When it is determined to initiate the second phase, the method further comprises initiating the second phase of the relocation method comprising the resumption of the processing of the data packets of the flow at the target instance of the first function.

In accordance with a second aspect, a method for enabling a relocation of a first function for processing data packets of a flow associated with a device from a source instance to a target instance of a communication network is provided. The first function for processing the data packets of the flow is controlled by an arrangement of the communication network. The method is performed in the source instance and comprises receiving an instruction to prepare for the relocation of the first function from the source instance to the target instance. The instruction is received from the arrangement controlling the function. The method also comprises preparing for the relocation to the target instance in response to the instruction.

In accordance with a third aspect, a method for enabling a relocation of a first function for processing data packets of a flow associated with a device from a source instance to a target instance of a communication network is provided. The first function for processing the data packets of the flow is controlled by an arrangement of the communication network. The method is performed in the target instance and comprises receiving an instruction to prepare for the relocation of the first function from the source instance to the target instance. The instruction is received from the arrangement controlling the function. The method also comprises preparing for the relocation in response to the instruction.

In accordance with a fourth aspect, an arrangement for a communication network is provided. The arrangement is configured to control a first function for processing data packets of a flow associated with a device. The arrangement is configured to relocate the first function for processing data packets from a source instance to a target instance. The relocation is triggered by an initiated relocation of a second function for processing data packets of the flow. The arrangement is further configured to initiate a first phase of a relocation method for relocating the first function. The first phase comprises stopping the processing of the data packets at the source instance of the first function and preparing resumption of the processing at the target instance of the first function. The first phase is initiated before the relocation of the second function is finalized. The arrangement is also configured to determine whether to initiate a second phase of the relocation method finalizing the relocation of the first function when the first phase is completed. The determining is based on information related to a progress of the relocation of the second function. The arrangement is configured to initiate the second phase of the relocation method comprising the resumption of the processing of the data packets of the flow at the target instance of the first function, when it is determined to initiate the second phase.

In accordance with a fifth aspect, a source instance for a communication network is provided. The source instance is configured to enable a relocation of a first function for processing data packets of a flow associated with a device from the source instance to a target instance of the communication network. The first function for processing the data packets of the flow is configured to be controlled by an arrangement of the communication network. The source instance is configured to receive an instruction to prepare for the relocation of the first function from the source instance to the target instance. The instruction is received from the arrangement controlling the function. The source instance is further configured to prepare for the relocation to the target instance in response to the instruction.

In accordance with a sixth aspect, a target instance for a communication network is provided. The target instance is configured to enable a relocation of a first function for processing data packets of a flow associated with a device from a source instance of the communication network to the target instance. The first function for processing the data packets of the flow is configured to be controlled by an arrangement of the communication network. The target instance is further configured to receive an instruction to prepare for the relocation of the first function from the source instance to the target instance. The instruction is received from the arrangement controlling the function. The target instance is also configured to prepare for the relocation in response to the instruction.

In accordance with further aspects, computer programs are provided. The computer programs comprise computer readable code which when run on the apparatus according to the respective fourth, fifth and sixth aspects causes the apparatus to perform methods in accordance with the respective first, second, and third aspects above. Computer program products are also provided, each comprising a computer readable medium and one of the computer programs stored on the computer readable medium.

An advantage of the different aspects above is that relocation of two functions for processing data packets of a flow can be done at least partly in parallel which will reduce the total relocation procedure length.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1A:
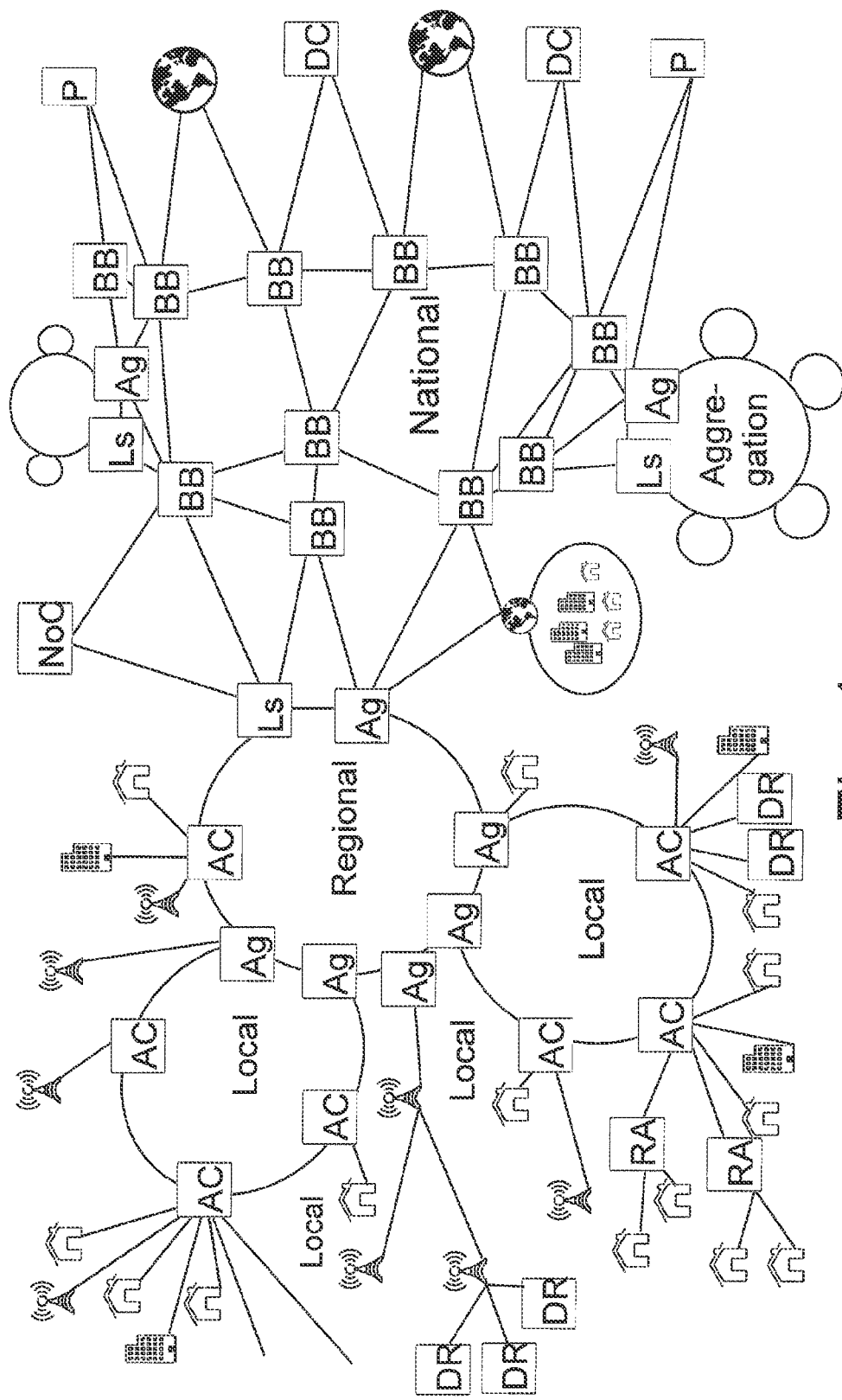
FIG. 1a is a schematic illustration of a deployment view of a communication network.
Figure 1B:
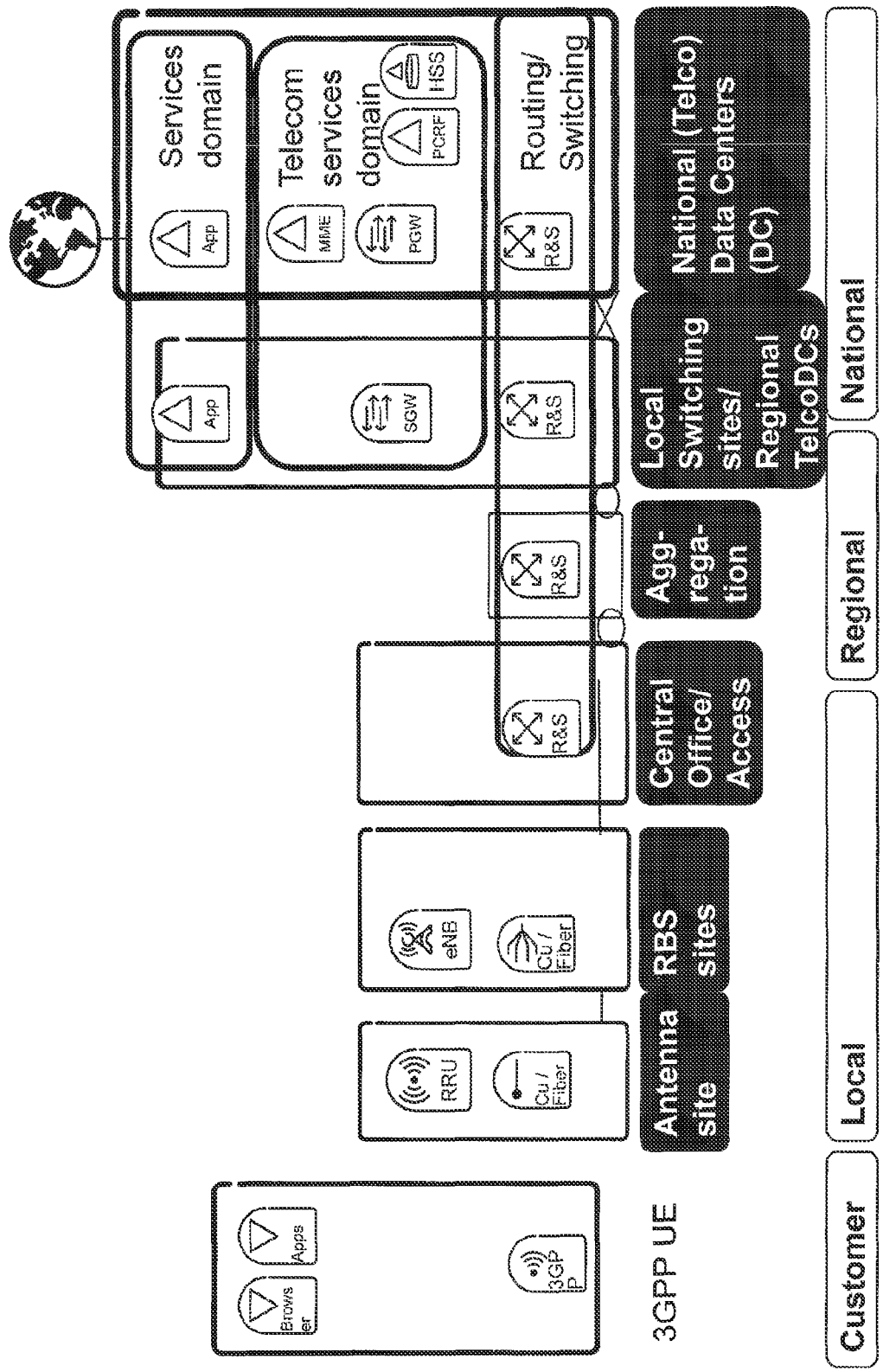
FIG. 1b is a schematic illustration of another deployment view of a communication network.
Figure 2A:
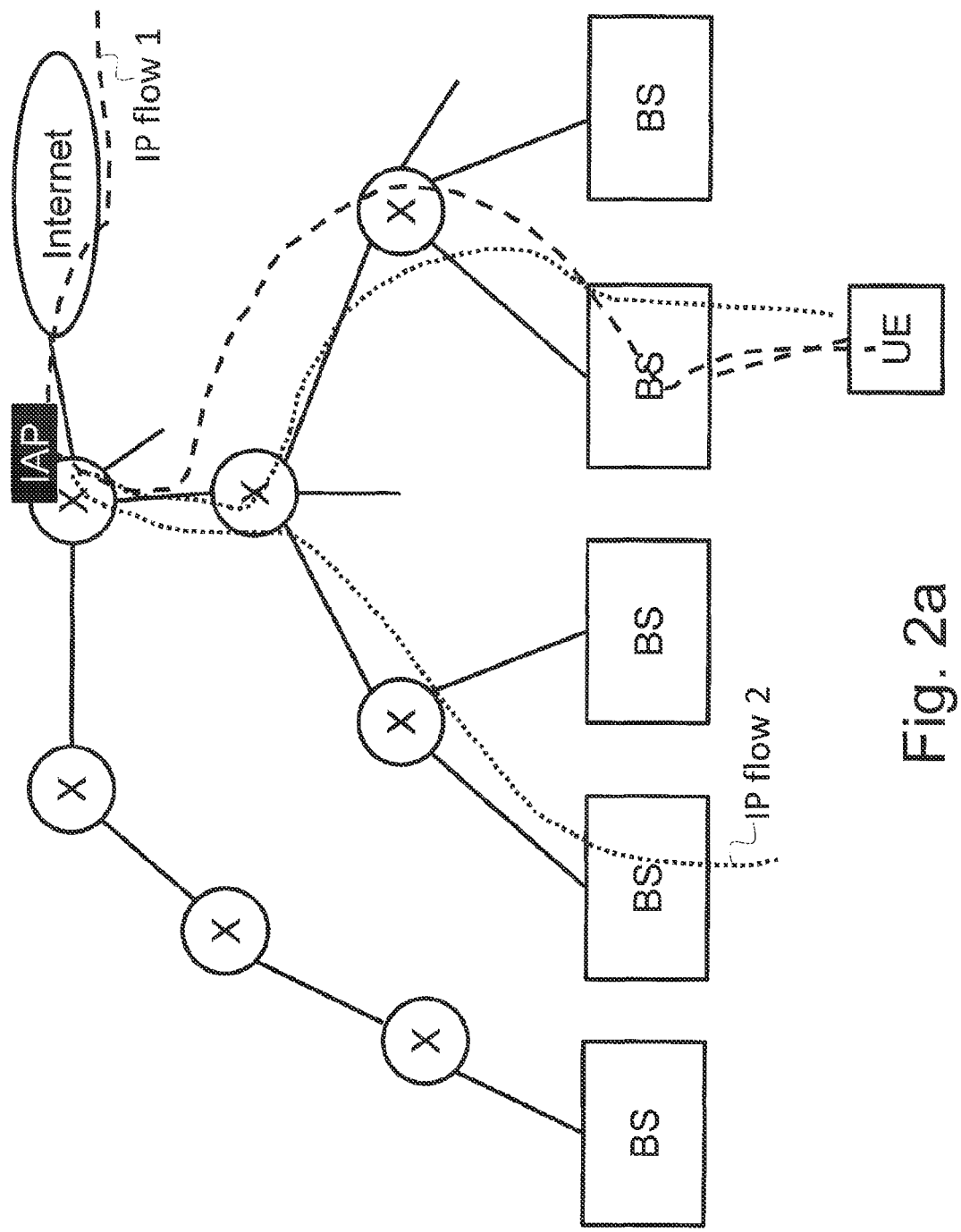
FIGS. 2a-d are schematic illustrations of routing of flows for different IAP placements in different scenarios.
Figure 2B:
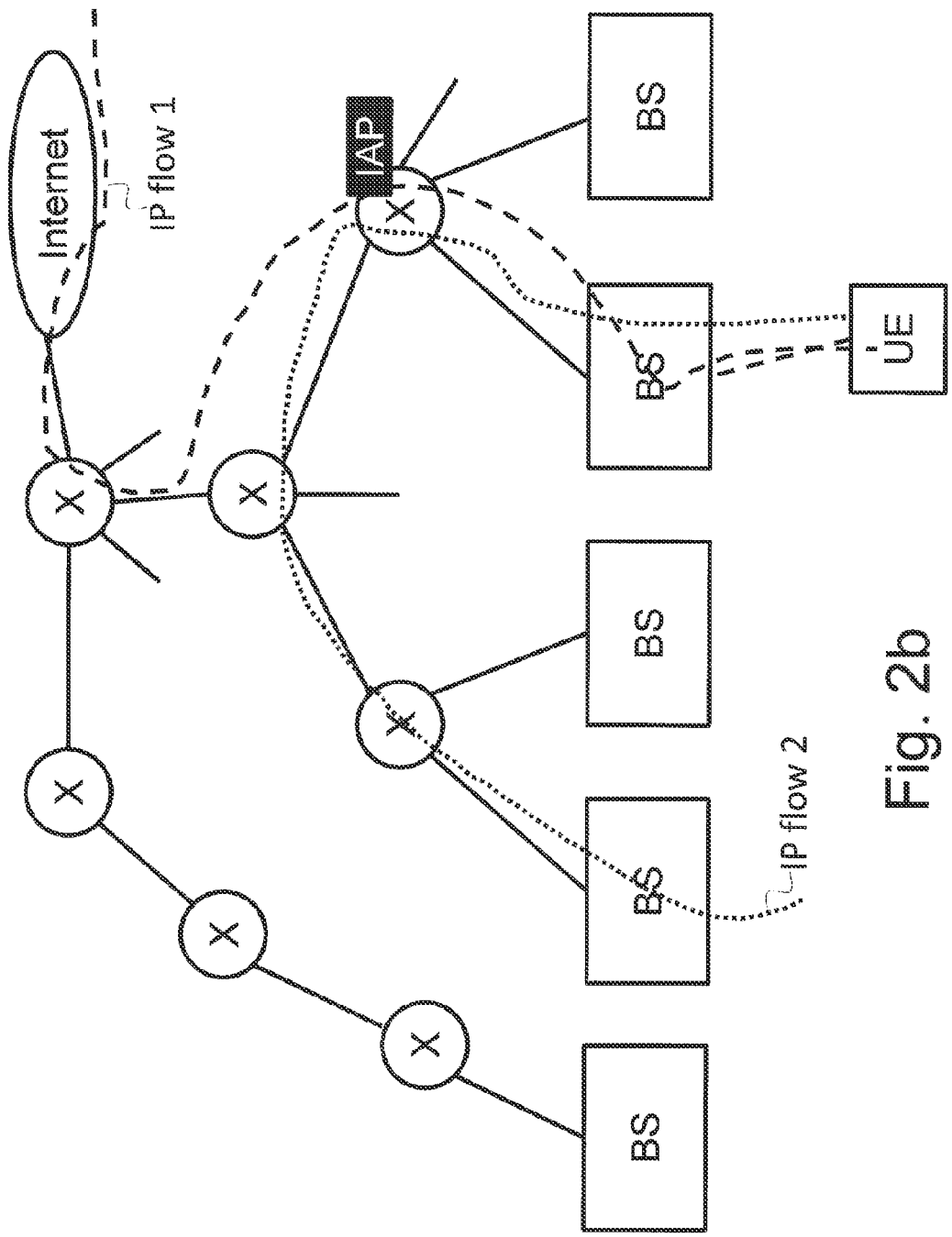
Figure 2C:
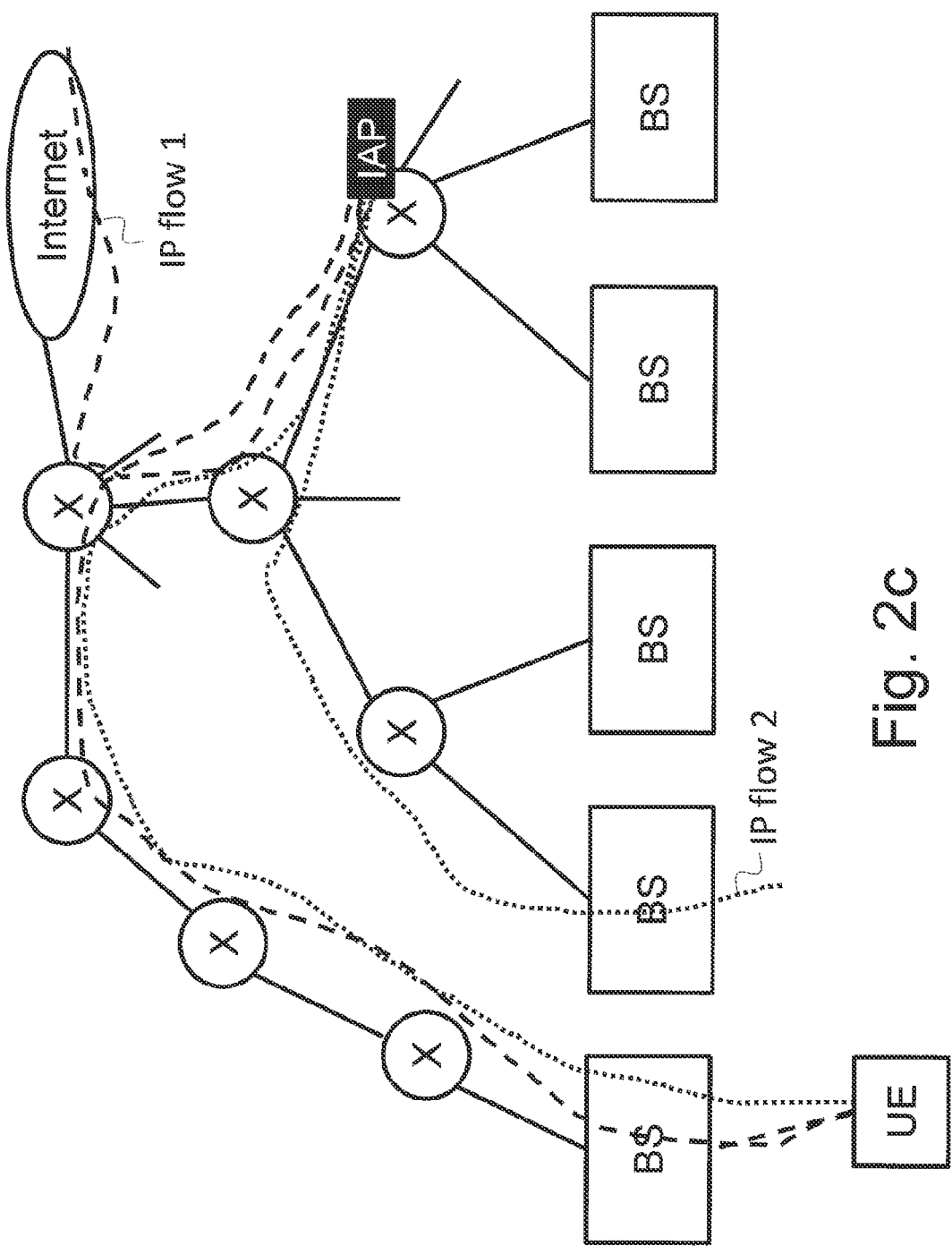
Figure 2D:
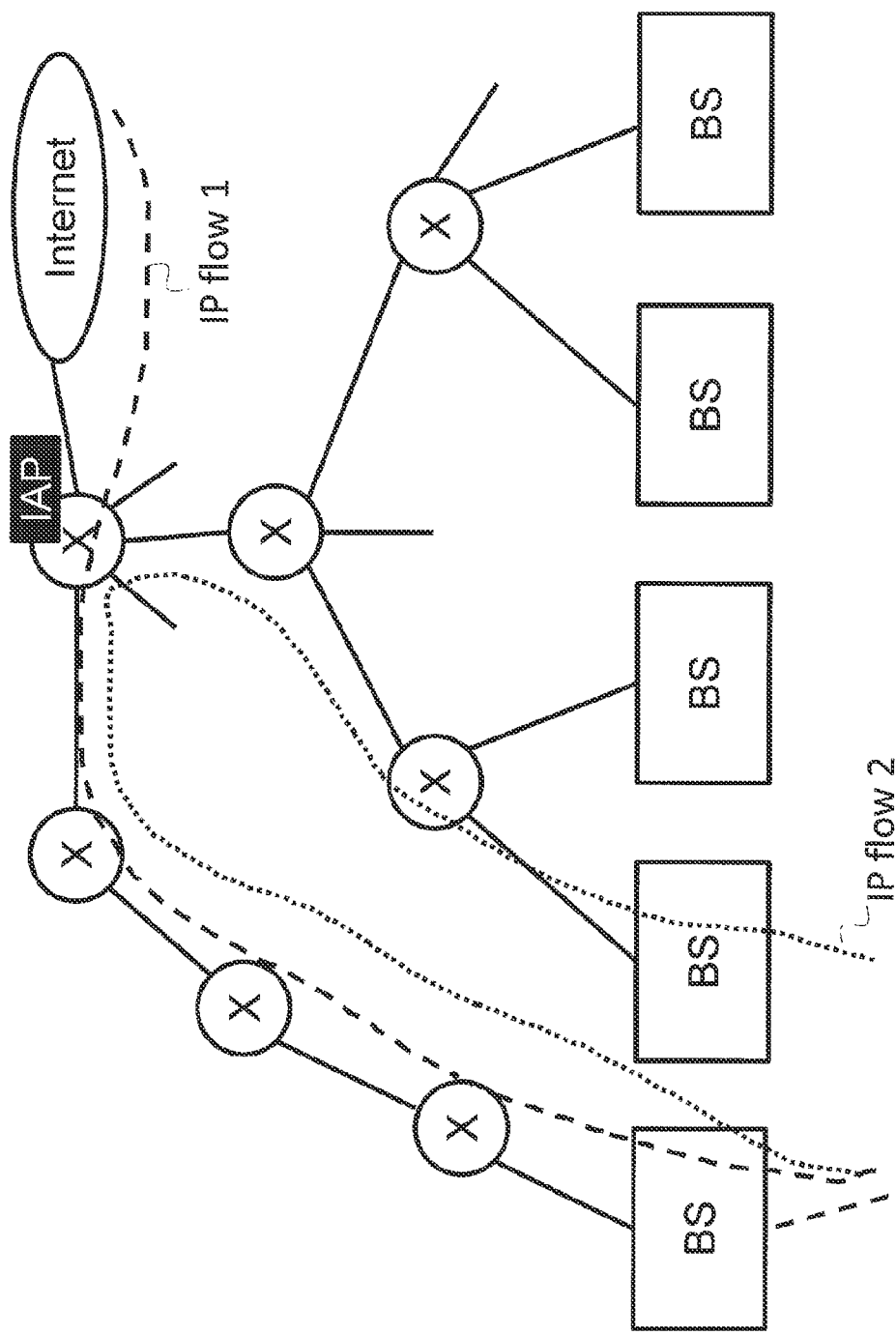
Figure 3:
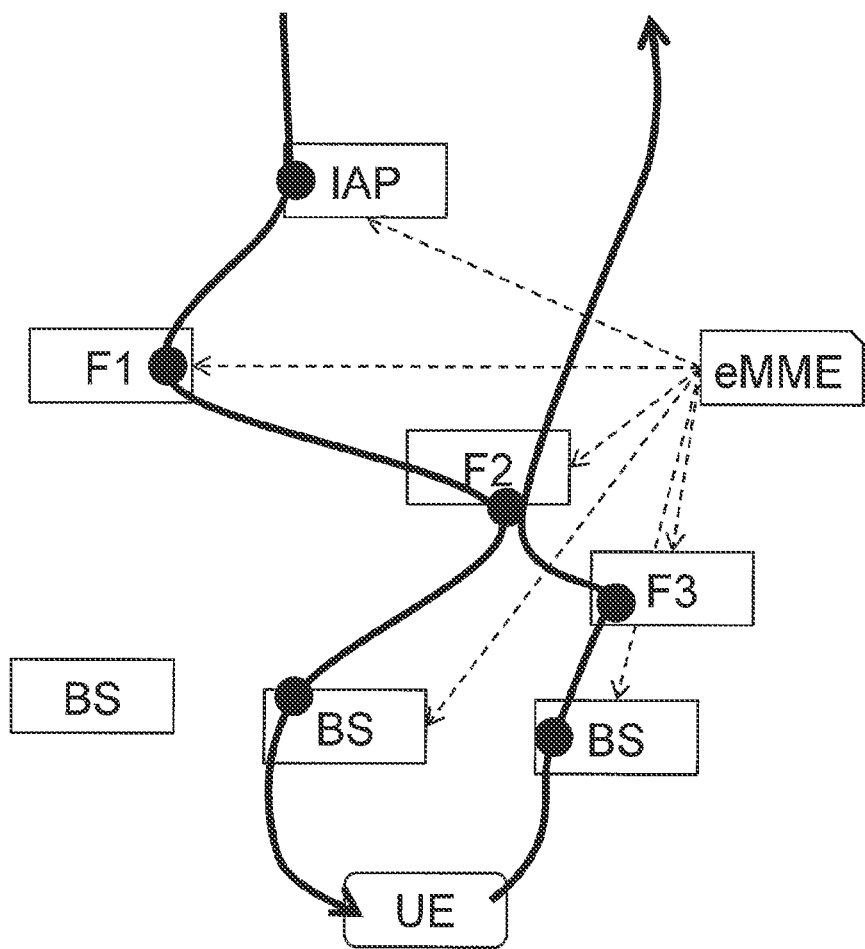
FIG. 3 is a schematic illustration of a high level overall fifth generation (5G) architecture.

Embodiments are described in a non-limiting general context in relation to an example scenario in a high level 5G network architecture in which user plane or data packet processing functionality is relocated. The high level 5G-architecture is schematically illustrated in FIG. 3, visualizing a draft version of one possible 5G-architecture. A mobile device, called UE, has a radio interface with one or more BSs. The UE may exchange IP packets with a peer (not shown in FIG. 3). The peer may be on the same network, or may be in an external network, such as the Internet. The network operator domain includes, besides BSs, one or more IAPs, one or more evolved MMEs (eMME) handling all control plane related signalling and zero or more functions for processing data packets (F1, F2, F3). It should be noted that embodiments of the invention may be applied to any network architecture, so the 5G network architecture illustrated in FIG. 3 should be seen as an example. Embodiments of the invention may e.g. be applied in both wireless and fixed communication networks and for both wireless and fixed devices.

The problem of sub-optimal routing of flows that may occur for different IAP locations, e.g. when the UE is moving, may be addressed by an anchorless architecture where all packet processing functions can be relocated, even the one(s) that would normally constitute an anchor. A relocation of one or more functions for processing data packets of a flow associated with a device enables the change or relocation of the IAP for the device, in order to achieve an optimal routing of the data packets of a flow associated with a specific end user device.

In FIG. 3 described above, three packet processing functions are shown, F1, F2 and F3. For each data packet that such a function receives, the function performs some kind of processing and forwards the processed packet. Example functions include encryption/description of packets, policy and charging enforcement, deep packet inspection (DPI) and proxy functions. Functions may be chained, which means that a packet passes a function and is then forwarded to a next function of the chain. The chain of functions also comprises switching elements that routes the data packets to the correct function. These switching elements may or may not be co-located with the function. In one embodiment, the switching element bases its routing decision on routing rules and information in the header field of the packet. In other embodiments, the switching element may mark the packet in some way e.g. by adding an extra header field. Another switching element, later in the chain, will then use that marking to make its routing decision.

Chains of functions may be valid on various granularities, e.g. for a group of UEs, on a per-UE basis, or on a per-flow basis. The flow is defined by its five-tuple, i.e. source and destination IP addresses in the IP header, protocol field in the IPv4 header or next header field in the IPv6 header, and source and destination port numbers in the transport protocol header. The transport protocol may be Transmission Control Protocol (TCP), User Datagram Protocol (UDP), or Stream Control Transmission Protocol (SCTP). Function chains may be symmetrical or asymmetrical. In the symmetrical chain the same functions are passed in uplink and in downlink. The example in FIG. 3 shows a dual-radio UE with an asymmetrical chain, where functions F3 and F2 are passed in the uplink and functions F1 and F2 are passed in the downlink. In the uplink, the last function in the chain forwards the packet as a plain IP packet.

In the example scenario, function chains are set up and controlled by the eMME. The setup of a chain could be performed when the UE attaches to the network or when a new flow is started. A function chain for an aggregate of UEs can also be setup before the UEs' attach to the network. The functions may be part of a Software Defined Networking (SDN) environment and the eMME may act as an SDN controller.

The UE's IP address topologically belongs to one or more IAPs. This implies that each IP packet sent from the peer to the UE will pass one such IAP. The function of the IAP is to forward the packet to the first function in the downlink chain.

Initial Attach in the High-Level Architecture

Figure 4:
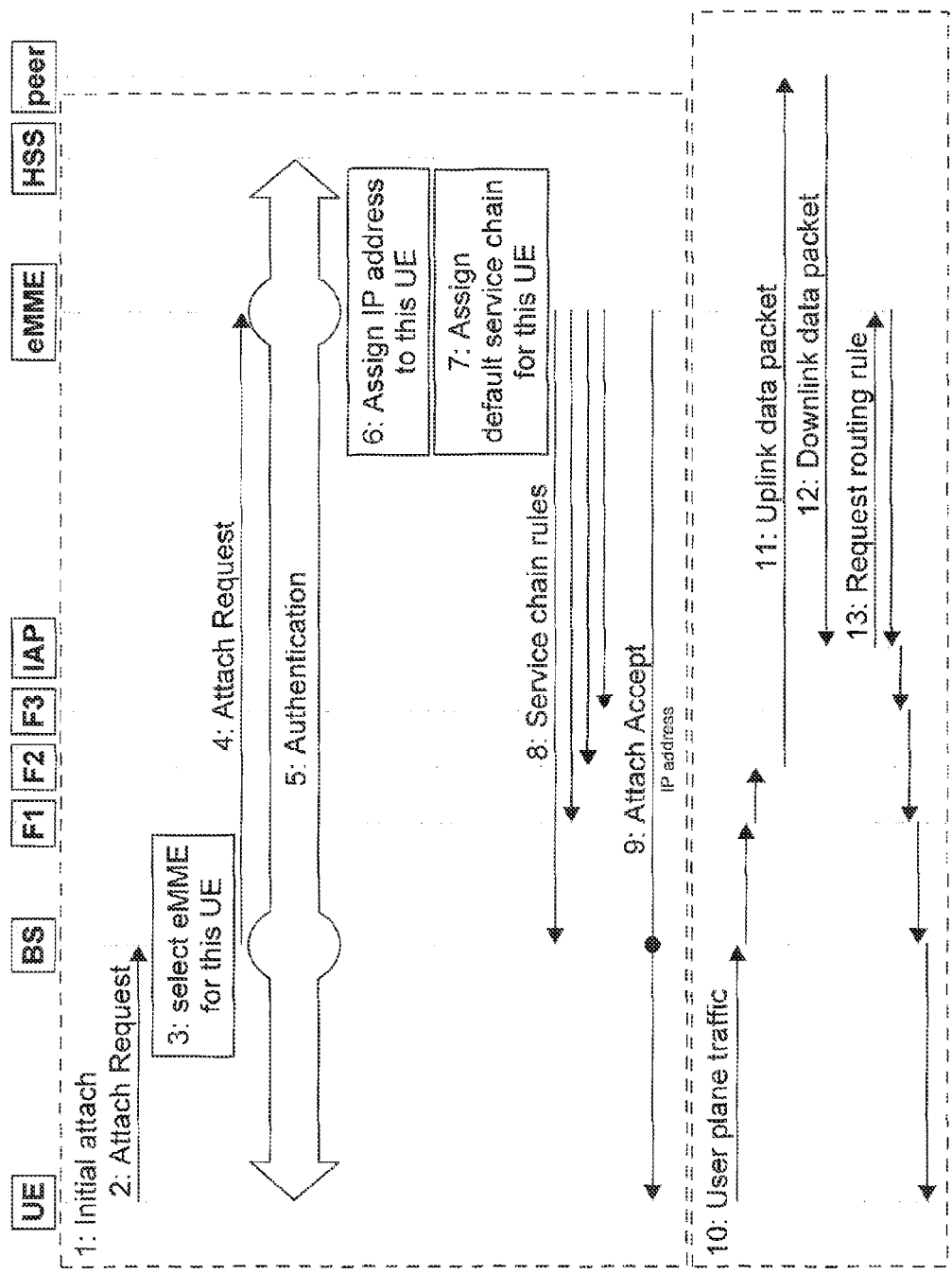
FIG. 4 is a signaling diagram illustrating the initial attach procedure in a network based on the high level 5G architecture.

The signaling diagram or call flow in FIG. 4 illustrates how an initial attach procedure is performed in a communication network based on the high-level architecture. In this example the UE attaches to a single BS. The chain of functions, also referred to as the service chain, for uplink packets comprises F1 and F2, and the service chain for downlink packets comprises F3 and F1. The service chain also comprises switching elements that affects the routing of the data packets of the flow in the chain, as explained previously.

The BS receives the attach request message (step 2) and selects an eMME (step 3). The attach request message is then forwarded to the eMME (step 4) and an authentication is performed (step 5). The HSS may contain a user profile. After successful authentication, the eMME assigns an IP address to the UE (step 6) and sets up a default service chain (step 7-8). Every UE has a default service chain that is used for all flows to which no specific service chain is valid. At a later stage, not shown in this call flow, more specific service chains for this UE, e.g. for a single flow, may be added. Once the default service chain has been setup, the eMME sends an attach accept message to the UE (step 9). After that step, the UE may start to send uplink data (step 11) and may receive downlink data (step 12). For downlink packets, the IAP queries the eMME (step 13) to find out to which processing function to send the packet. The frequency of these requests can be optimized in several ways. E.g. the IAP can retrieve all routing rules for a particular UE or IP address and cache those.

One embodiment of the architecture shown in FIG. 3 is the existing EPC architecture, in which case the IAP, i.e. the PGW, is the only IAP that advertises the IP address for a certain UE as long as it remains attached to the network, i.e. an anchor-based architecture. Functions like Packet Data Convergence Protocol (PDCP) processing are then performed on the BS, which is called eNB. Functions like policy and charging enforcement are performed on the PGW and the forwarding between eNB and PGW is implemented using GTP tunnels. The service chains would be symmetrical. Additional functions like DPI and TCP proxying are placed "above" the PGW, i.e. after the PGW in the uplink direction.

Seen from a 5G perspective, the current EPC architecture as defined in 3GPP TS 23.401 and TS 23.402 has a number of drawbacks. One drawback is that the architecture lacks the concept of service chaining, and therefore does not provide flexible means to insert new functions in the chain or having multiple chains for a single UE. Another drawback is that all packets for a particular UE or a particular APN for a UE need to pass one and the same PGW. The PGW thus acts as an "anchor point". This may lead to sub-optimal routing.

As part of the 5G project an anchorless architecture is being studied. Another embodiment of the high-level architecture is such anchorless architecture. In that case, multiple IAPs may advertise the UE IP address into the IP routing system, so downlink packets may end up at one of several IAPs. Still each IAP would forward the packet to the first function in the downlink chain. Uplink packets sent from the last function in the chain can be routed directly to the Internet via the physically closest border router, or can be routed directly to an operator's IAP if the peer is connected to such an IAP. Different functions in the chain may be placed at different locations. In one scenario all functions could be co-located on the BS. In this way the most optimal routing would be achieved. In another scenario it may not be feasible to always place all functions on the BS. Some functions may be placed at a more central place in the network; e.g. in a regional or even a national data center site. At the setup time of the service chain, the eMME may find a service chain that provides an optimal route through the network. It should be noted that other traffic flows involving the same UE may pass through a different IAP and different service chains and different function locations may be used for these flows, e.g. in order to achieve optimal routing also for these flows.

Even if functions in an anchorless architecture are initially placed to achieve optimal routing, if the UE moves to another BS and the packet processing functions do not move, the route may become sub-optimal. Current virtualization and networking technologies do not provide a means to relocate a specific packet processing function from one instance to another instance for a service chain specific to a single end user. A function defines what to do with a packet. A function instance is executing the function at a specific location in the network deployment.

Generic Relocation Method

Figure 5A:
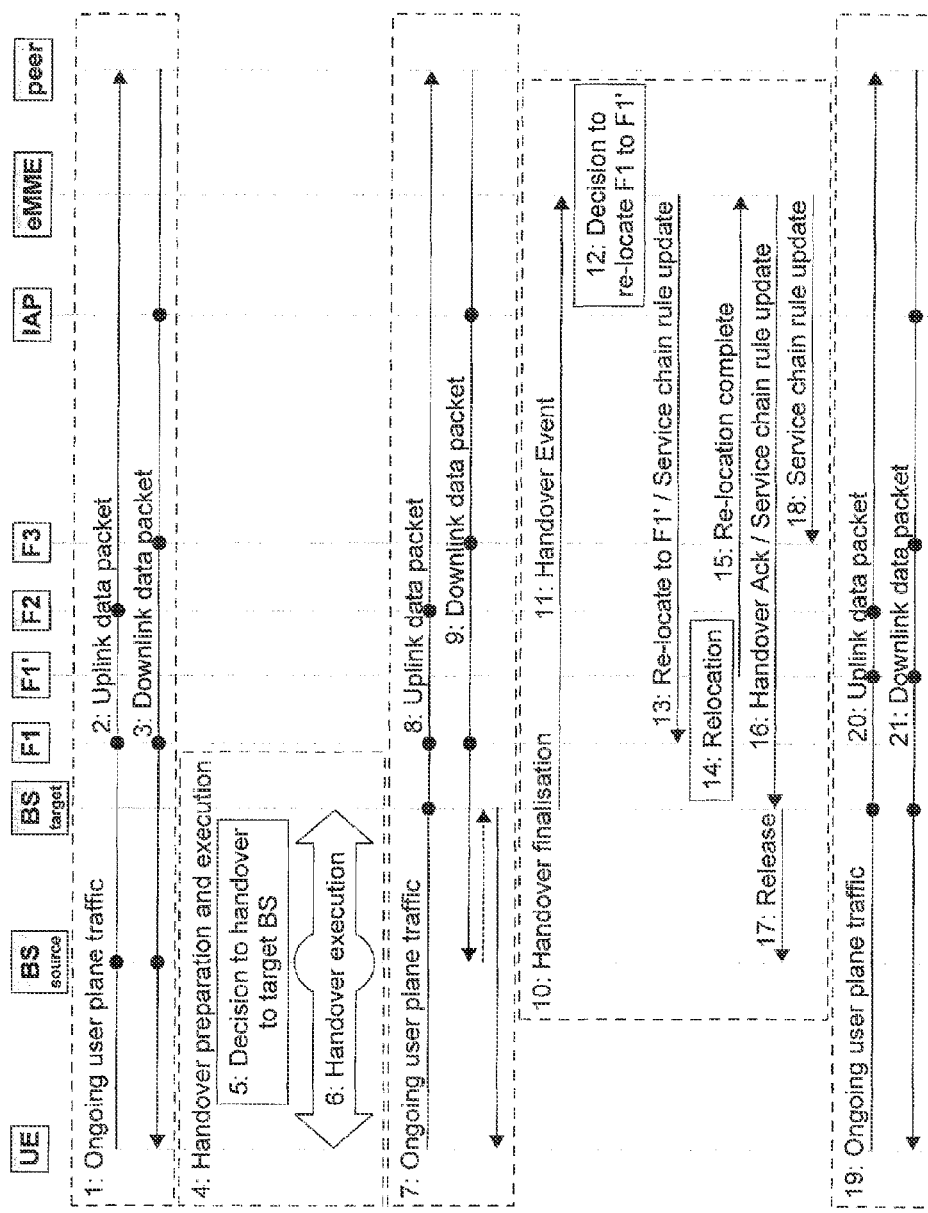
FIGS. 5a-b are signaling diagrams illustrating relocation methods.

The signaling diagram or call flow in FIG. 5a illustrates a generic relocation method procedure in the context of an inter-BS radio handover. The relocation method is part of block 10 which describes the handover finalization. The event that is triggering relocation is a handover of the UE from one BS to another. Other triggers are also possible, such as:

A planned maintenance of a function instance requiring the removal of all traffic from this instance;

Optimization of chain forwarding. The eMME may e.g. decide to relocate a function or a set of functions to a more central location in order to reduce the rate of further relocations, caused e.g. by a fast moving device which performs handovers frequently;

A change of policies, such as the insertion of a new function which requires being co-located with other functions or a re-ordering of functions. Another example is a request that a certain function shall be closer to the device for low-latency processing;

A decision by the eMME to relocate a function for the purpose of load balancing.

The service chain consists of the same functions as those in the initial attach example. The handover, block 4, corresponds to the "X2-based handover" as defined in 3GPP TS 23.401.

In block 10, function F1 is relocated to a target instance of that same function. This target instance is denoted F1'. One way to relocate multiple functions would be to perform block 10 once for each function.

The eMME decides to relocate F1 to F1' (step 12) and instructs F1 to do a relocation (step 13). In the latter step the eMME also informs F1 about a service chain rule update, i.e., that downlink packets are to be sent to the target BS instead of to the source BS. The service chain rule update thus comprises an update of one or more switching elements in the chain of functions for processing the data packets of the flow. The switching elements are updated with information related to the relocated function. The actual relocation of the function is step 14. Multiple methods are possible here, and these are explained in subsequent sections. As part of step 14, F1 informs F1' of the now updated downlink service chain rule.

Once the relocation is done, F1' informs the eMME (step 15). The eMME then updates the proceeding and succeeding functions in the uplink service chain; the target BS is informed to send uplink data to F1' instead of to F1 (step 16), and F3 is informed to send downlink data to F1' instead of to F1 (step 18). The order in which 16 and 18 are performed is irrelevant.

To assist F1' in handling packets in-order, the "end marker" solution used for user plane forwarding at handovers in Evolved Packet System (EPS) can be reused here. E.g. in downlink, F3 can send an end marker to F1 right after the chain update (step 18). F1 forwards the end marker to F1'. After that, provided that F1 has no more uplink data to forward to either F3 or F1', F1 can also release its context. Alternatively, F1' can request F1 to release its context when F1' has received the end marker, either immediately upon receiving the end marker or a certain time after the reception of the end marker.

Step 16 may also serve as an acknowledgement to step 11. Such acknowledgement could then also trigger an explicit release message to the source BS (step 17). Alternatively, the release of the source BS is done implicitly by letting F1 send an end marker to the source BS.

Specific Methods to Relocate a Function

Hereinafter, example embodiments of relocation methods are described. They thus describe how step 14 in the call flow in FIG. 5a can be performed. There may be more examples of such relocation methods. Furthermore, the methods may be combined. As one example, one relocation method may be used for one subset of the flows in the chain, and another relocation method may be used for another subset of the flows in the chain. The eMME may instruct the function to use a specific relocation method. Alternatively, the function itself may decide which relocation method to use. The decision of what relocation method to use is further described below.

Figure 5B:
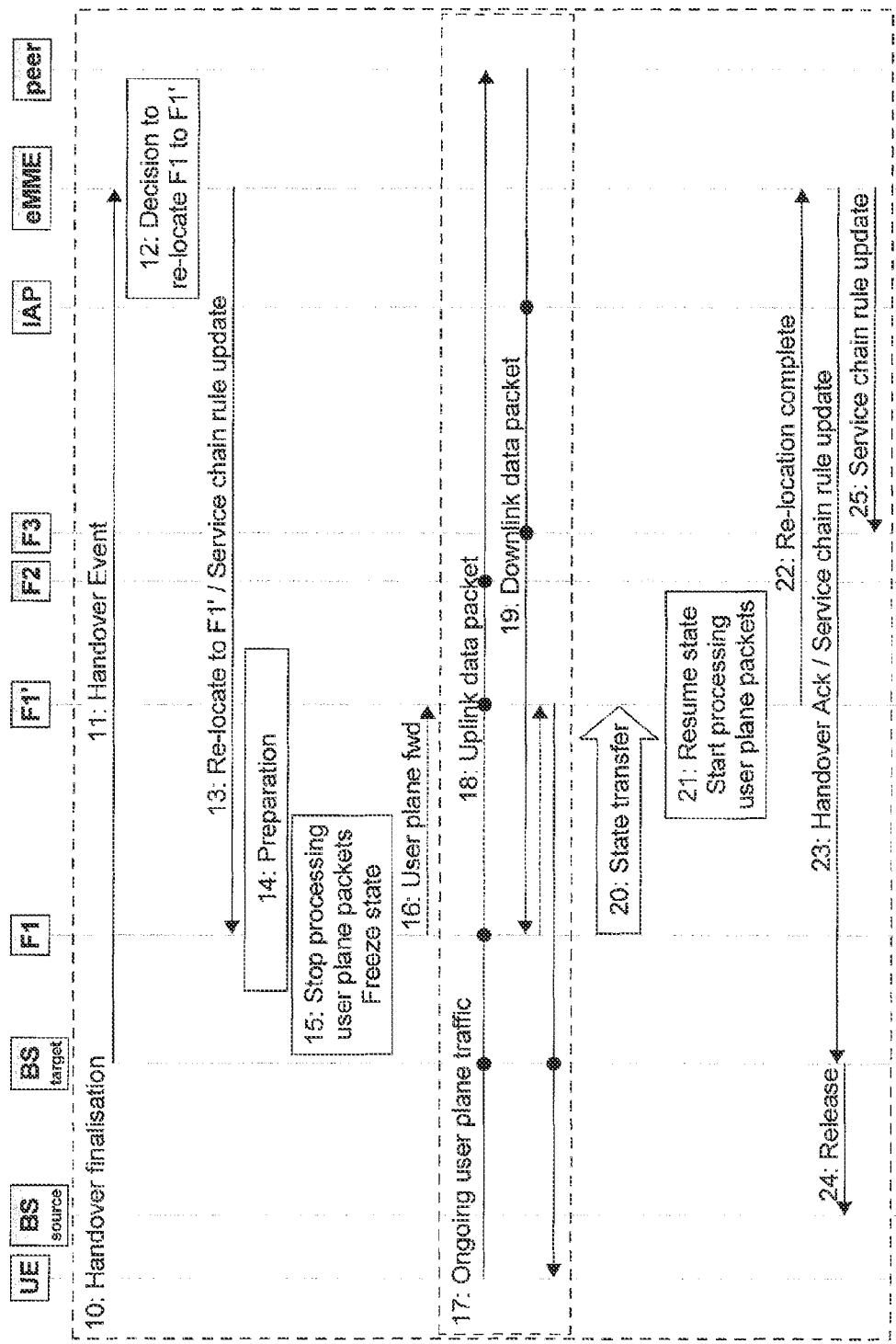

Freeze-Move-Resume Relocation Method (FIG. 5b)

The signaling diagram or call flow in FIG. 5b specifies block 10 of the generic call flow in FIG. 5a in more detail. The rest of the generic call flow remains the same.

In this relocation method, the state related to the user plane packet processing of the source instance of the function is frozen (step 15). Then all state is copied to the target instance of the function (step 20). Finally, packet processing is resumed in the target instance based on the copied state (step 21).

State involves all parameters related to the processing of the packets for this UE's service chain. Examples of such parameters include: buffered packets, counters, sequence numbers, acknowledgements, user subscription information, security keys, and timers.

Freezing state means that the function stops processing packets such that the state is no longer updated. Packets that are sent to the function while the state is frozen can be forwarded to the target instance of the function (step 16).

Before freezing the state, the source instance could run a preparation phase (step 14). It could e.g. assess how much state is to be transferred, and perform bandwidth allocation on the source-target link for the transfer. It could also select the best protocol to use for the state transfer (step 20). Different protocols may suit better in different situations. If TCP is to be used, the source could run the slow-start with bogus data or query the nodes on the source-target link and negotiate a higher initial window size. A further option is not to reserve anything, but to send the state transfer with some higher priority class, such as network control. This would be at the expense of regular network traffic. Either way, the source could calculate how long the relocation would take, and inform the eMME about this. This optional informing of the eMME could be done with a message from F1 to the eMME after step 14 (not shown in FIG. 5b). The eMME then takes the final go/no-go decision. This could be done by an explicit signaling to the eMME for every relocation, or by pre-provisioned rules previously received from the eMME.

The freeze-move-resume method is in particular beneficial if the state is fairly small and if the required bandwidth to transfer the state is small compared to bandwidth available to regular traffic, and if the relocation time can be kept short.

Pre-Copy Relocation Method

The pre-copy method is an attempt to decrease the time that user plane packets cannot be processed. In particular, it tries to decrease the time between "freeze state" and "resume state" in the freeze-move-resume approach. The idea is that while the source instance is processing packets, it continuously updates information elements in its user state. The frequency of these updates will differ per information element and will also depend on the traffic intensity and the type of traffic. A subset of the information elements, e.g. those that are not updated frequently, could be pre-copied to the target while the source continues to process packets. Once the source stops processing packets, only the updated and not-yet-copied information elements need to be transferred. The other steps are equal to the freeze-move-resume method.

A trivial approach to implement this method would be to pre-copy the entire state, then freeze, then copy the information elements that have been updated since the pre-copy. Another approach would be to base the implementation on a "distributed database", where distribution means that copies of the same information element are kept in the source and target instance. Yet another approach would be to have a classifying period before the pre-copying. The classification would result in an "update rate" on each information element. The more frequent updates, the higher the rate. Once the classification is performed, the pre-copying is only done on those elements that have an update rate below a certain threshold. Given the threshold and the available bandwidth for the transfer, the time where no user plane processing is possible can be estimated. The threshold value or the time when no processing is possible can be negotiated with the eMME.

The pre-copy method is in particular beneficial if there is a lot of state to transfer and if large parts of the state are more or less stable.

Flushing Relocation Method

This method is an attempt to limit the number of buffered user plane packets that are copied to the target function as part of the state transfer. This method is in particular beneficial for functions that act as proxy, e.g. a TCP or MPTCP proxy. These functions may have large user plane packet buffers.

The idea is that for those packets the TCP or MultiPath TCP proxy receives from the UE (uplink) and the UE's peer (downlink), it sends a TCP ACK with receiver window size 0. Receiving the first ACK with window size 0 makes the UE and the peer stop sending packets, as the allowed number of outstanding bytes is the minimum of the congestion window and the receiver window, hence 0. However, there may be other packets arriving after sending the first ACK with window size 0, as the peer may have sent additional data packets, the window allowing. Reception of these packets is also acknowledged with TCP ACK with window size 0 by the TCP or MultiPath TCP proxy. Finally, the TCP or MultiPath TCP proxy will not receive any new data packets after approximately one RTT after sending the first ACK with window size 0.

The (MP)TCP proxy continues to send already buffered data to the UE (downlink) and to the peer (uplink). During this process, some data packets may arrive from the senders, as described above. There are multiple ways to handle this situation, In the first option, the TCP or MultiPath TCP proxy repeats sending a TCP ACK with receiver window size 0, and will flush those packets subsequently. Also, when sending the first TCP ACK with window size 0 the proxy starts a timer that is set to RTT or slightly larger. Before this timer expires, the relocation cannot happen, as new data packets may still arrive that needs to be flushed. In another option, the data packets arriving after the first TCP ACK with window size 0 will be part of the user plane context and will be relocated. They may or may not be acknowledged by the old TCP or MultiPath TCP proxy. As a third option, they will be forwarded on the user plane, but not via the relocation method, to the new function and buffered there. As a fourth option, they are discarded and not acknowledged by the TCP or MultiPath TCP proxy and will be re-sent by the endpoints according to the TCP algorithm at a later point after the receiver window opened again.

Eventually, all buffered packets that can be sent have been sent and the UE and the peer have acknowledged these packets. At this point in time, the relocation to the target instance is made. This step is performed using one of the previously mentioned methods, e.g. steps 14-21 in the freeze-move-resume method in FIG. 5b. After the relocation, the target instance of the proxy starts acknowledging packets to the UE and the peer with a window size >0, enabling the UE to send uplink packets and the peer downlink packets.

There may be variants to the above described procedure. The purpose, however, is that the source function empties, or "flushes", its data packet buffers before the relocation is performed. Note that in some cases it may not be possible to fully empty the buffer. E.g. in MPTCP there may be multiple subflows, and packets for one subflow are buffered because there is a dependency towards a packet on another subflow that has not yet arrived at the proxy.

Parallel Relocation

The generic relocation method described above is sub-optimal in the sense that the radio handover needs to complete before the relocation of the function F1 for processing data packets of the flow can begin. This results in more jitter during the handover and also in a longer overall procedure. These problems are addressed by a solution where a relocation of one or more packet processing functions may be done in parallel with the radio handover.

Although embodiments are described in relation to an example scenario where a handover is the cause of or is triggering the relocation of a first packet processing function, and where it is the handover—which may be seen as a kind of relocation—and the relocation of the first packet processing function that are performed in parallel. However, it should be noted that embodiments of the invention may be applied to a scenario where it is the relocation of a second packet processing function in a chain of functions that is performed in parallel with the relocation of the first packet processing function. Such an scenario may be illustrated by the signaling In FIG. 6c where signals/steps 5 to 17 are removed and where the decision to relocate in step 18 may be triggered by something else than a handover.

So instead of relocating multiple functions by subsequently performing block 10 in FIG. 5a once for each function as suggested above in section "Generic relocation method", embodiments of the invention allows to perform part of the relocation method in parallel for the functions, thus reducing the time needed for the overall relocation procedure. The proposed relocation method is thus applicable to all scenarios when more than one function needs to relocate.

In embodiments of the invention a function relocation is performed in parallel with the radio handover. However, a non-negligible portion of radio handovers fail, which implies that the traffic or data packets of the flow must fallback to the original base station. Therefore, if the function relocation is performed in parallel with the radio handover procedure in order to reduce user disturbance, the fallback must also be quite seamless and free from disturbances for the user.

Function relocations are therefore split into two phases, a preparation phase and a finalization phase. The preparation phase can run in parallel with the radio handover and includes the required context transfer. The finalization phase is carried out only when the radio handover has completed, as will be further described with reference to FIGS. 6a-c.

Figure 6A:
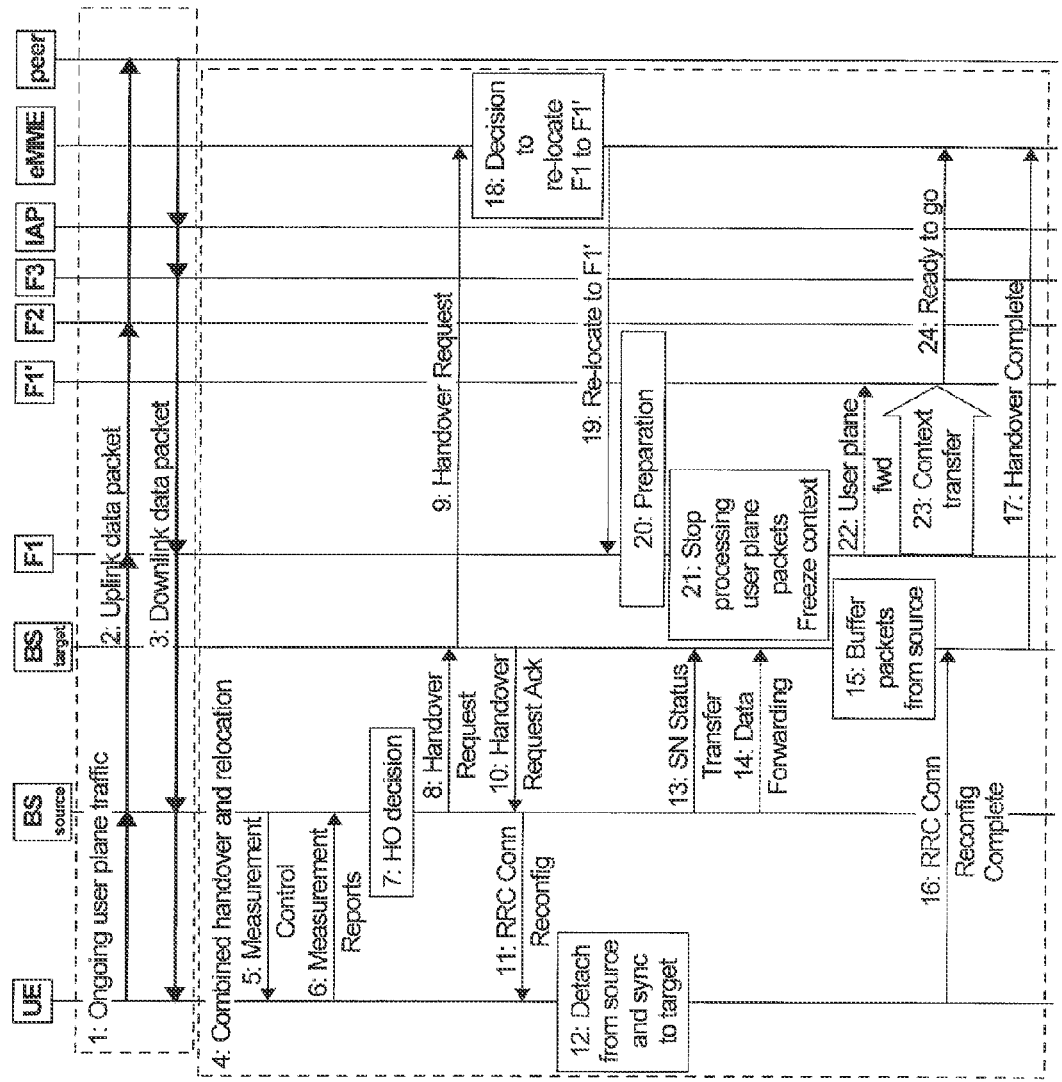
FIG. 6a-c are signaling diagrams illustrating parallel relocations according to embodiments of the invention.

The signaling diagram in FIG. 6a (divided on two pages for readability purpose, the two parts of the figure denoted 6a' and 6a") shows the parallel relocation case for the freeze-move-resume method described above with reference to FIG. 5b. Although the freeze-move-resume relocation method is used in this example scenario, the other relocation methods described previously such as the pre-copy and the flushing relocation methods may be applied as well in embodiments of the invention. In FIG. 6a, the uplink flow goes from the base station of the user through function F1 and function F2, whereas the downlink flow goes via function F3 and function F1 before reaching the base station. It is determined that packet processing function F1 is to be relocated. The process of the radio handover corresponds to steps 8-17 and 31-32 in the signaling diagram, whereas the process of the function relocation corresponds to steps 19-24, 27-31 and 33. The remaining steps do not belong to any part, but to the whole process.

The two processes (handover and function relocation) run in parallel in the preparation phase. They are synchronized in step 26 in which it is determined whether to finalize the relocation (go) or to roll back the relocation (no-go), when both the radio handover and the preparation phase of the F1 function relocation process signals completion in step 17 and step 24 respectively. At this stage, the eMME may finalize the F1 function relocation (go) by informing the new instance of the function F1' that it can resume data packet processing of the flow in step 27 and by performing the chain rule update in steps 30 and 31, which comprises an update of one or more switching elements in the chain of functions such that the flow is routed through the new instance of the function F1'.

Figure 6B:
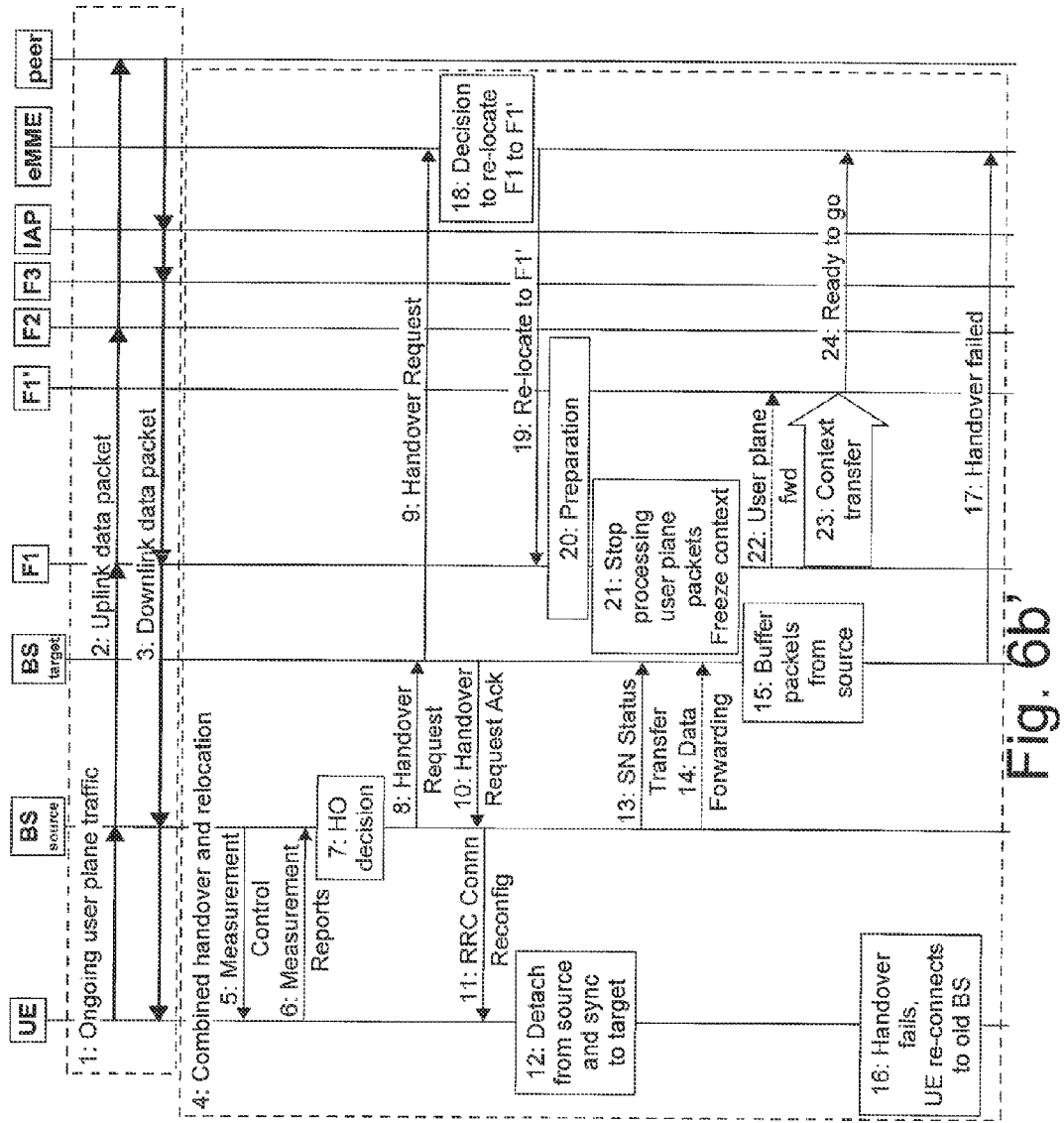
Figure 6B:
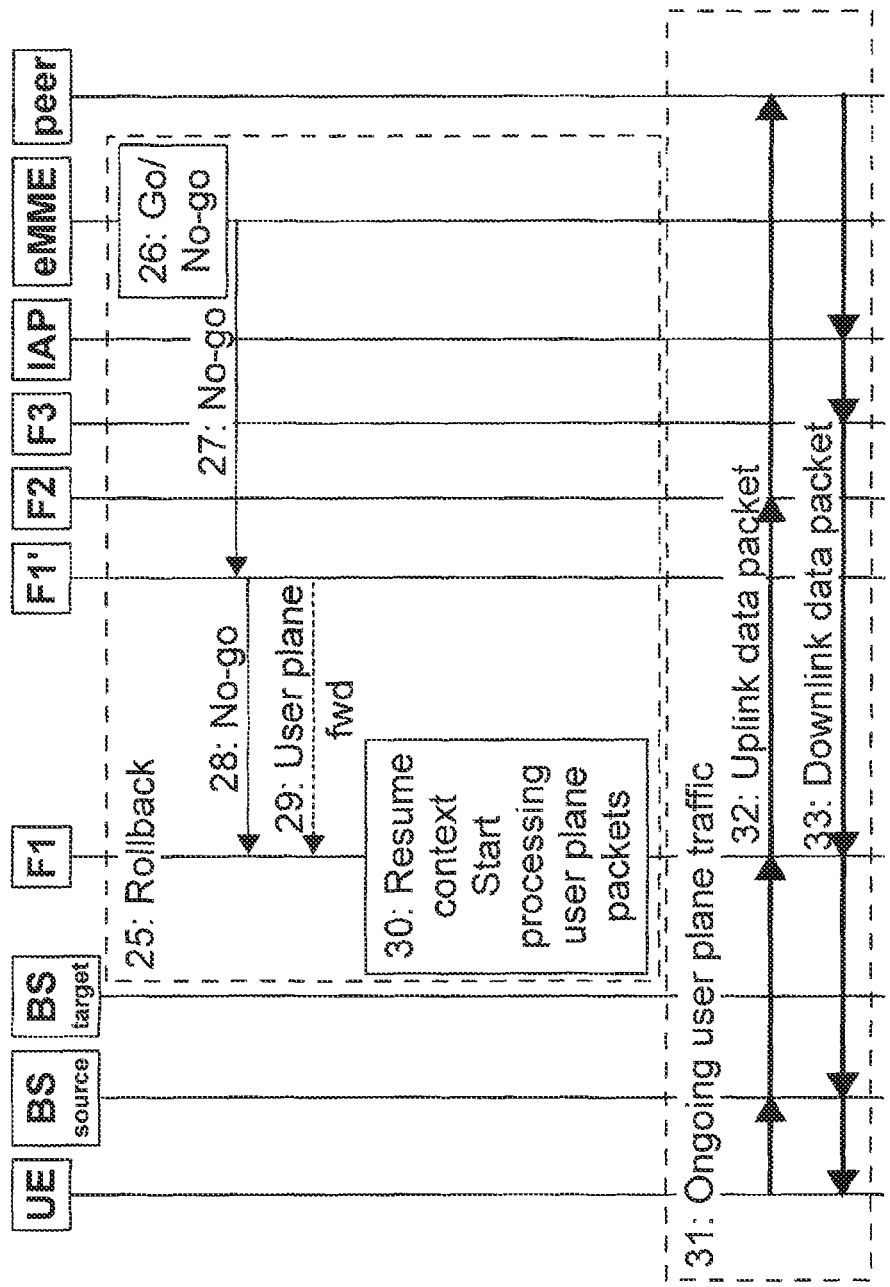

The signaling diagram in FIG. 6b (divided on two pages for readability purpose, the two parts of the figure denoted 6b' and 6b") shows the same scenario, with the exception that the radio handover fails. This results in that the eMME rolls back the F1 function relocation in the second phase (no-go) instead of finalizing it. There is no need to update the chain rules in this case either. When the target instance of the function F1' receives the "no-go" decision in step 27 of FIG. 6b, the data packets that have been forwarded to the target instance F1' in step 22 need to be forwarded back to the source instance F1 in step 29. This step can be avoided if the source instance of the function F1 keeps a copy of forwarded packets, or if forwarded packets are discarded ("hard handover"). An alternative option could be that the target instance F1' forwards the packets it has already received from the source instance F1 to an instance of the next function F2 in the uplink and to the base station in the downlink. This may cause reordering of packets, if the packet forwarding from target instance F1' and the resumed packet processing at source instance F1 are not coordinated. Although the example scenario illustrated in FIG. 6b describes a roll back for the handover which is performed in parallel with a relocation of a function for processing data packets, embodiments of the invention also cover a scenario where relocations of two functions for processing data packets are performed in parallel and where one of the relocations may fail thus implying a roll back of both relocations.

Figure 6C:
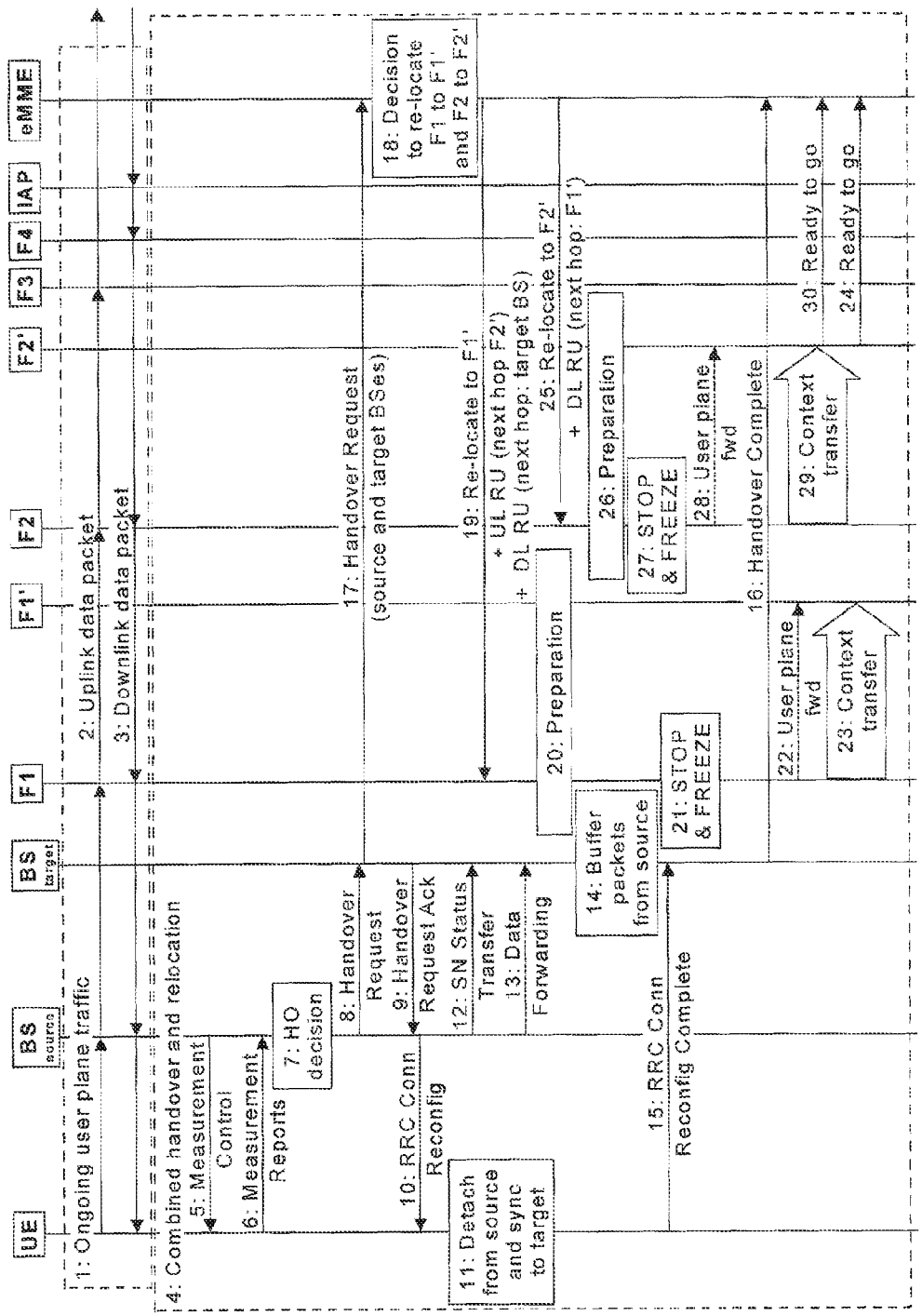

FIG. 6c (divided on two pages for readability purpose, the two parts of the figure denoted 6c' and 6c") illustrates a signaling diagram for a more complex scenario, where more than one function is relocated. In this example uplink traffic goes via the base station to function F1, to function F2, and further to function F3, whereas downlink traffic goes from function F4, to function F3, to function F2, and further to function F1 and to the base station. Both F1 and F2 are relocated in association with the handover. The process of the radio handover corresponds to steps 8-17 and 36-37 in this signaling diagram, whereas the process of the F1 function relocation corresponds to steps 19-24, 33-36 and 38, and the process of the F2 function relocation corresponds to steps 25-30, and 39-43. Again, the other steps do not belong to any part, but to the whole process.

As one can see, the procedure is largely similar to the function relocation shown in FIG. 6a. The eMME prepares both the relocation of function F1 and function F2 in the preparation phase and even sets up the chain forwarding entries the new instances will use if the relocation completes. Packet forwarding between source and target instance of both functions F1 and F2 are set up, since there may be packets in flight between or buffered at these functions.

An advantage of this example embodiment is that the finalization phase is quick, as it simply comprises the resuming of packet processing at each function and an update of the chain rules at the uppermost and lowermost end of the chain, i.e. in function F4 and in the base station respectively.

Methods According to Embodiments

Figure 7:
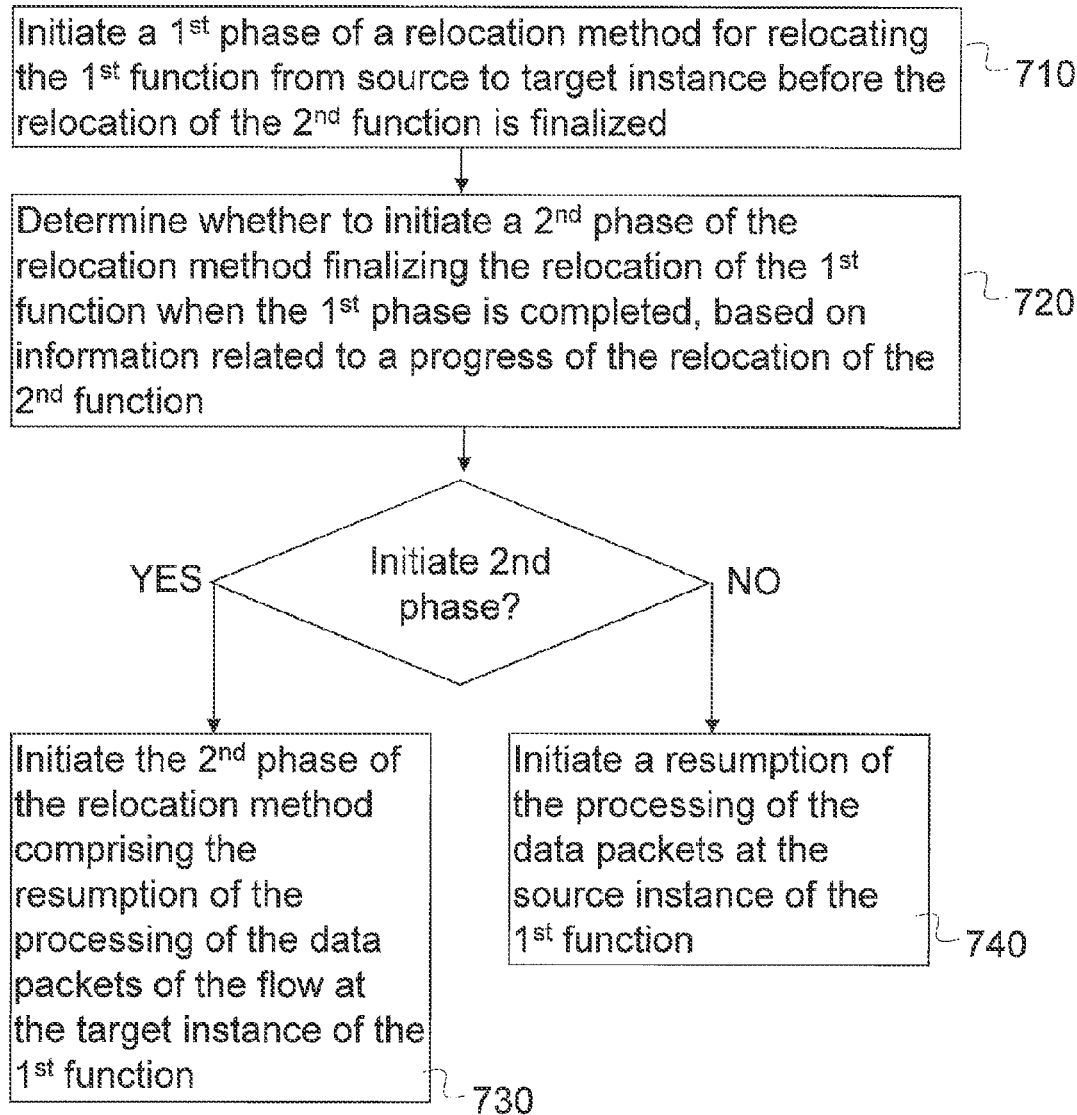
FIG. 7 is a flowchart illustrating the method in an arrangement according to some embodiments of the present invention.

FIG. 7 is a flowchart illustrating embodiments of a method for relocating a first function for processing data packets of a flow associated with a device, where the first function is relocated from a source instance 150 to a target instance 160. The method is performed in an arrangement 100 of a communication network controlling the first function for processing data packets. As illustrated in the example embodiments described previously, the arrangement 100 may be an eMME. The method is triggered by an initiated relocation of a second function for processing data packets of the flow. The method comprises:

710: Initiating a first phase of a relocation method for relocating the first function, the first phase comprising stopping the processing of the data packets at the source instance 150 of the first function and preparing resumption of the processing at the target instance 160 of the first function. The first phase may correspond to the preparation phase described above. The first phase is initiated before the relocation of the second function is finalized, which means that the relocations of the first and the second functions are partially done in parallel. Initiating the first phase of the relocation method for relocating the first function may in embodiments comprise sending an instruction to at least one of the source and the target instance of the first function to prepare for the relocation of the first function from the source instance 150 to the target instance 160.

720: Determining whether to initiate a second phase of the relocation method finalizing the relocation of the first function when the first phase is completed. The determining is based on information related to a progress of the relocation of the second function. The second phase may thus correspond to the finalization phase described above.

When it is determined to initiate the second phase, the method further comprises:

730: Initiating the second phase of the relocation method comprising the resumption of the processing of the data packets of the flow at the target instance 160 of the first function. Initiating the second phase may comprise sending a request to the target instance 160 of the first function to resume the processing of the data packets of the flow. Initiating the second phase may further comprise sending a message to the source instance 150 of the first function releasing the source instance 150 from processing the data packets of the flow.

In embodiments, the method may also comprise when it is determined not to initiate the second phase:

740: Initiating a resumption of the processing of the data packets at the source instance 150 of the first function. Initiating the resumption of the processing of the data packets at the source instance 150 of the first function may comprise sending a request to the source instance 150 to abort the relocation and resume the processing of the data packets.

In a first embodiment, the communication network may be a wireless communication network, and the device may be a wireless device. Such a wireless device may be subject to mobility. As described previously, the relocation of the second function may be a relocation of a serving base station function from a source base station to a target base station thus comprising a handover of the wireless device from the source base station to the target base station. The method may then be triggered by a request for the handover received from at least one of the source and the target base stations. The determining 720 whether to initiate the second phase may comprise receiving information from the target base station indicating whether the handover is completed. The information related to the progress of the relocation of the second function may thus be the information indicating whether the handover is completed. In one embodiment, it may be determined to initiate the second phase when the information indicates that the handover is completed. Such an embodiment is illustrated in FIG. 6a. In another embodiment, illustrated in FIG. 6b, it is determined not to initiate the second phase when the information indicates that the handover has failed.

In a second embodiment, no handover is involved and the second function for processing data packets of the flow may be relocated from a first instance to a second instance. The determining 720 whether to initiate the second phase may comprise receiving information from at least one of the first and the second instances indicating whether a first phase of a relocation method for the relocation of the second function is completed. The first phase comprises stopping the processing of the data packets at the first instance of the second function and preparing resumption of the processing at the second instance of the second function. In the second embodiment, it may be determined to initiate the second phase when the information indicates that the first phase of the relocation of the second function is completed, or it may be determined not to initiate the second phase when the information indicates that the first phase of the relocation of the second function has failed.

Figure 8A:
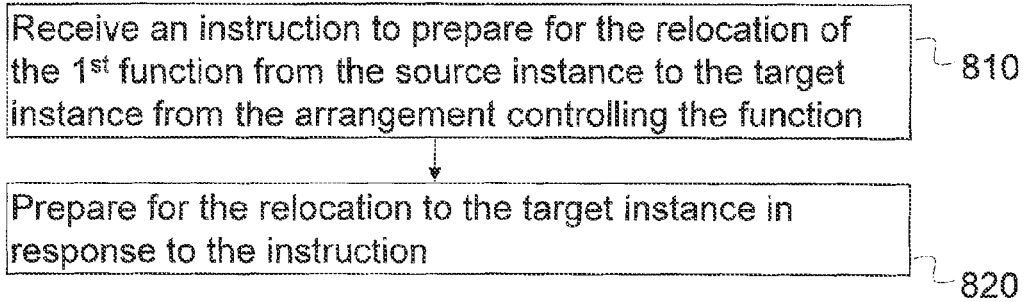
FIGS. 8a-c are flowcharts illustrating the method in a source instance of the function for processing data packets according to some embodiments of the present invention.

FIG. 8a is a flowchart illustrating embodiments of a method for enabling a relocation of a first function for processing data packets of a flow associated with a device from a source instance 150 to a target instance 160 of a communication network. The first function for processing the data packets of the flow is controlled by an arrangement 100 of the communication network. As illustrated in the example embodiments described previously, the arrangement 100 may be an eMME. The method is performed in the source instance 150. The method comprises:
  810: Receiving an instruction to prepare for the relocation of the first function from the source instance 150 to the target instance 160. The instruction is received from the arrangement 100 controlling the function.
  820: Preparing for the relocation to the target instance 160 in response to the instruction. As described in the section "Specific methods to relocate a function" above there are different relocation methods and the preparing for the relocation may in one embodiment (corresponding to the Freeze-move-resume relocation method) comprise:
    Freezing a state related to the processing of the data packets of the flow;
    Forwarding data packets of the flow to the target instance 160 during the freezing of the state; and
    Transferring the state to the target instance 160, such that the target instance 160 can resume the processing of the data packets of the flow based on the transferred state.
  In another embodiment (corresponding to the Pre-copying relocation method), the preparing for the relocation may further comprise before freezing the state:
    Copying information elements of the state to the target instance 160 while processing data packets of the flow. The transfer of the state to the target instance 160 excludes copied information elements that have not been updated as a result of processing the data packets of the flow.

Figure 8B:
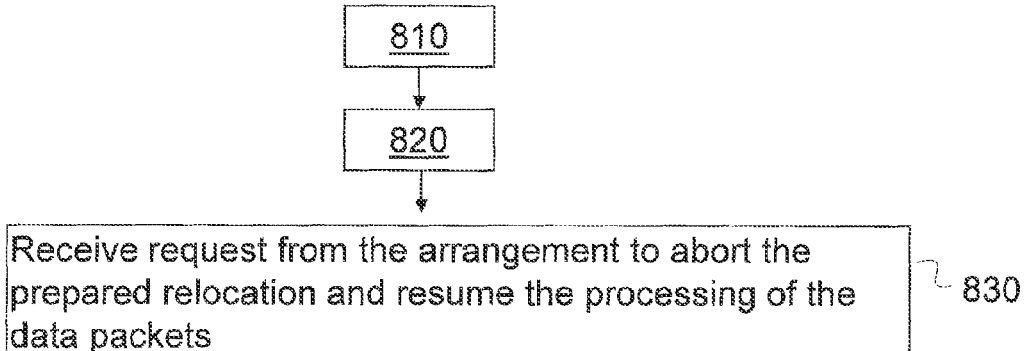

FIG. 8b is a flowchart illustrating another embodiment of the method in the source instance 150, corresponding to the procedure in the source instance at a no-go decision. The method may in addition to the receiving 810 of the instruction and the preparing 820 for the relocation further comprise:
  830: Receiving a request from the arrangement 100 to abort the prepared relocation and resume the processing of the data packets.

Figure 8C:
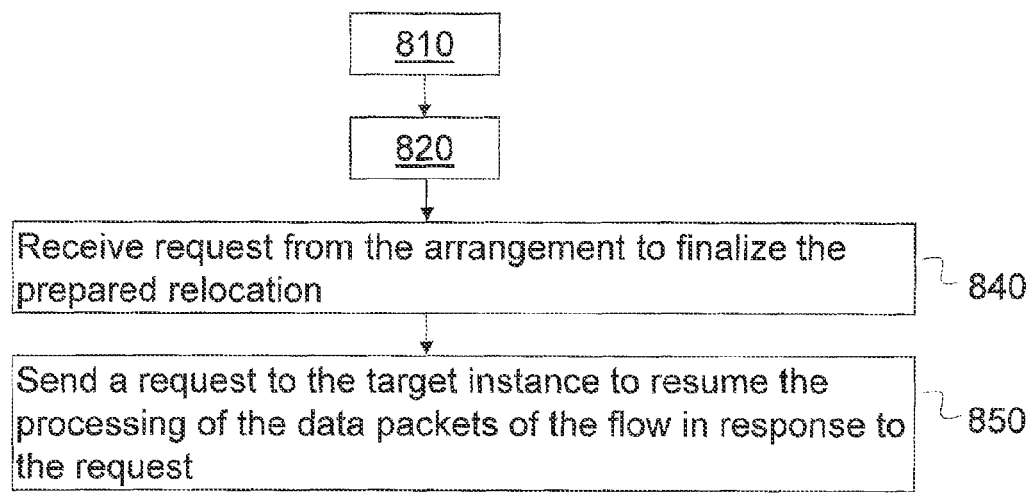

FIG. 8c is a flowchart illustrating still another embodiment of the method in the source instance 150, corresponding to the procedure in the source instance at a go decision. The method may in addition to the receiving 810 of the instruction and the preparing 820 for the relocation further comprise:
  840: Receiving a request from the arrangement 100 to finalize the prepared relocation.
  850: Sending a request to the target instance 160 of the first function to resume the processing of the data packets of the flow, the request being sent in response to the request to finalize the prepared relocation.

Figure 9A:
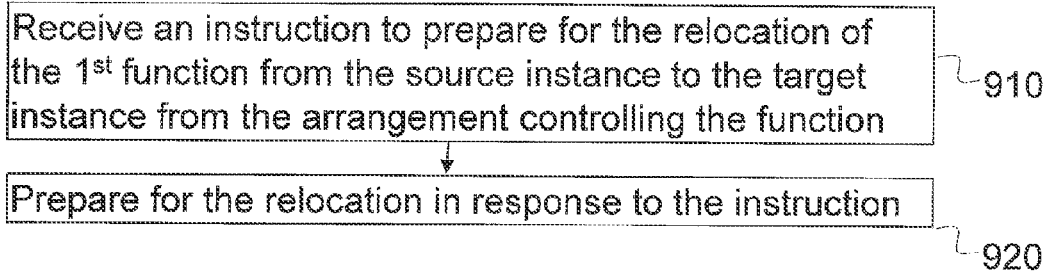
FIGS. 9a-c are flowcharts illustrating the method in a target instance of the function for processing data packets according to some embodiments of the present invention.

FIG. 9a is a flowchart illustrating embodiments of a method for enabling a relocation of a first function for processing data packets of a flow associated with a device from a source instance 150 to a target instance 160 of a communication network. The first function for processing the data packets of the flow is controlled by an arrangement 100 of the communication network. As illustrated in the example embodiments described previously, the arrangement 100 may be an eMME. The method is performed in the target instance 160. The method comprises:
  910: Receiving an instruction to prepare for the relocation of the first function from the source instance 150 to the target instance 160. The instruction is received from the arrangement 100 controlling the function.
  920: Preparing for the relocation in response to the instruction. Preparing for the relocation may comprise receiving data packets of the flow from the source instance 150 for processing at resumption, and receiving a state related to the processing of the data packets from the source instance 150.

Figure 9B:
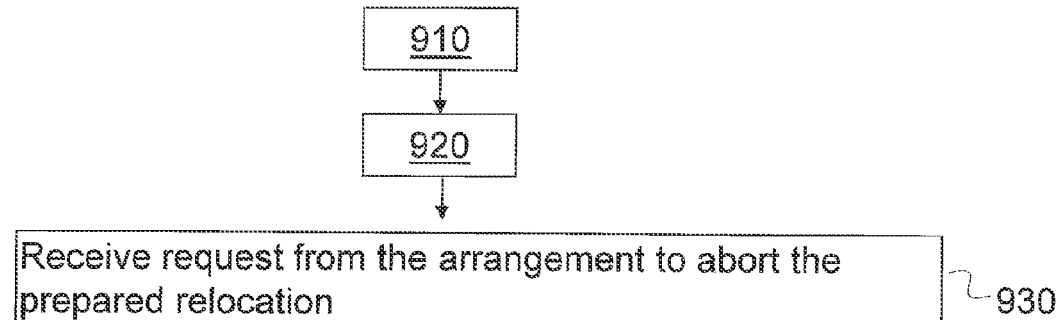

FIG. 9b is a flowchart illustrating another embodiment of the method in the target instance 160, corresponding to the procedure in the target instance at a no-go decision. The method may in addition to the receiving 910 of the instruction and the preparing 920 for the relocation further comprise:
  930: Receiving a request from the arrangement 100 to abort the prepared relocation.

Figure 9C:
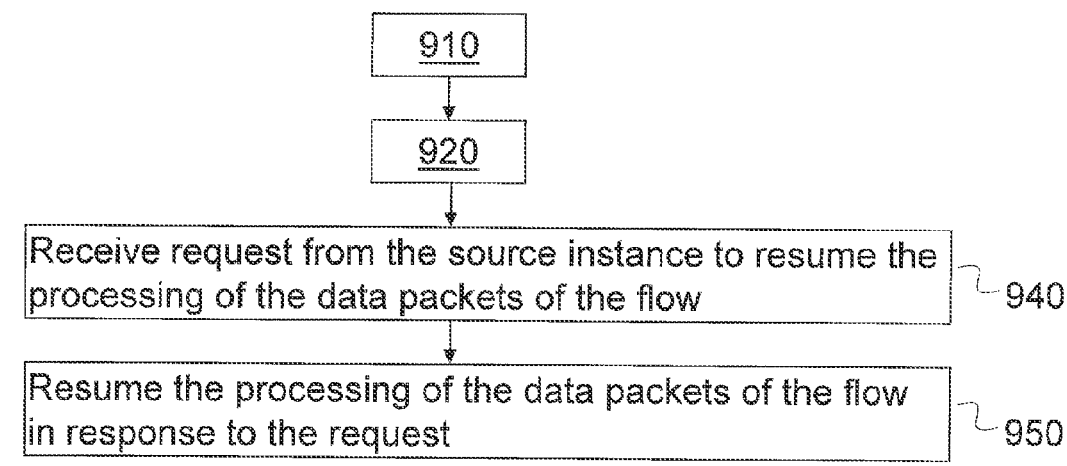

FIG. 9c is a flowchart illustrating still another embodiment of the method in the target instance 160, corresponding to the procedure in the target instance at a go decision. The method may in addition to the receiving 910 of the instruction and the preparing 920 for the relocation further comprise:
  940: Receiving a request from the source instance 150 of the first function to resume the processing of the data packets of the flow.
  950: Resuming the processing of the data packets of the flow in response to the request from the source instance 150.

In an alternative embodiment to the one illustrated with reference to FIG. 9c, the method may in addition to the receiving 910 of the instruction and the preparing 920 for the relocation further comprise receiving a request from the arrangement 100 to finalize the prepared relocation, and resuming the processing of the data packets of the flow in response to the request from the arrangement 100.

Apparatus According to Embodiments

Figure 10A:
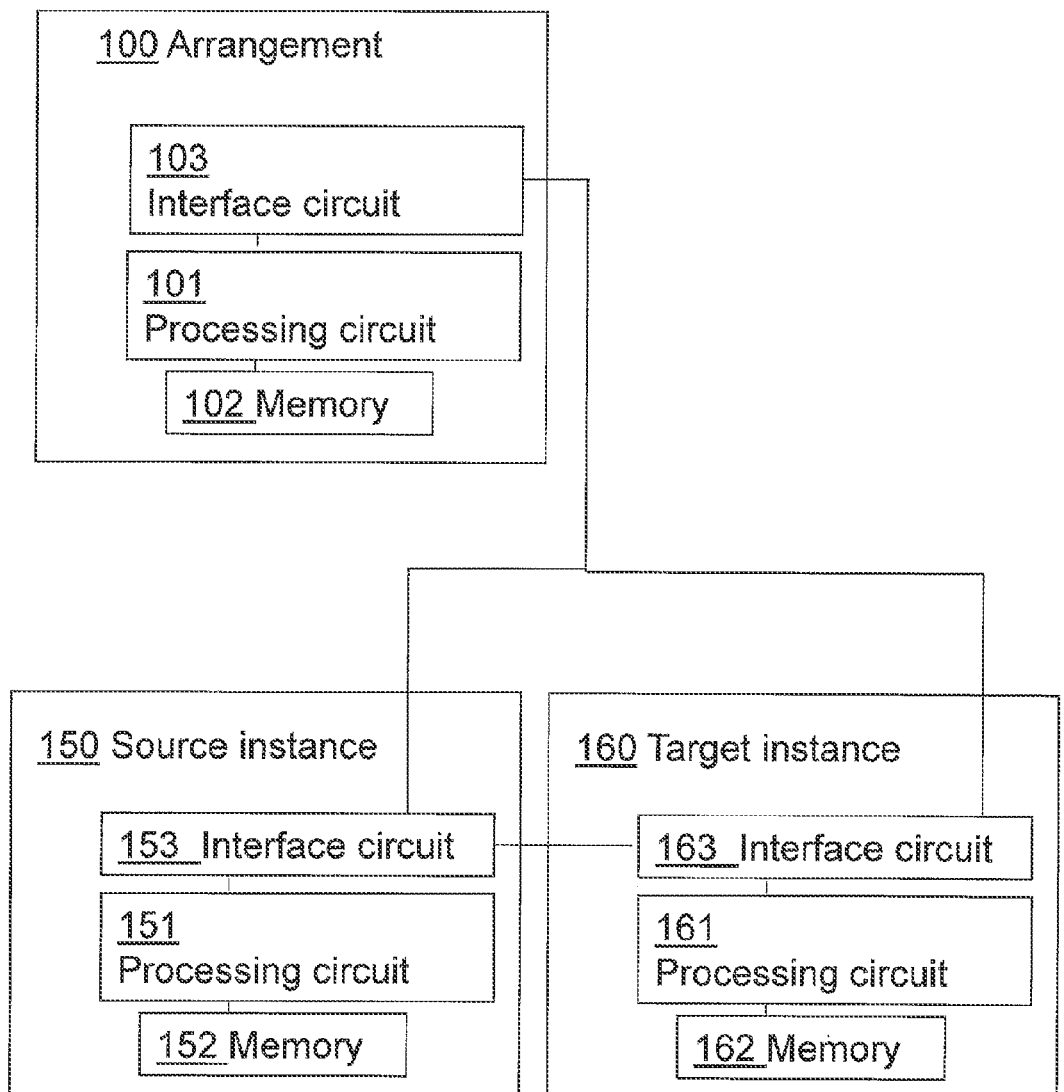
FIGS. 10a-b are block diagrams schematically illustrating the arrangement and the source and target instances of the function for processing data packets according to some embodiments of the present invention.

An embodiment of the arrangement 100 for a communication network is schematically illustrated in the block diagram in FIG. 10a together with the source instance 150 and the target instance 160. The arrangement 100 is configured to control a first function for processing data packets of a flow associated with a device. The arrangement 100 is also configured to relocate the first function for processing data packets from the source instance 150 to the target instance 160. The relocation is triggered by an initiated relocation of a second function for processing data packets of the flow. The arrangement 100 is further configured to initiate a first phase of a relocation method for relocating the first function. The first phase comprises stopping the processing of the data packets at the source instance 150 of the first function and preparing resumption of the processing at the target instance 160 of the first function. The first phase is initiated before the relocation of the second function is finalized. The arrangement 100 is also configured to determine whether to initiate a second phase of the relocation method finalizing the relocation of the first function when the first phase is completed. The determining is based on information related to a progress of the relocation of the second function. The arrangement 100 is configured to, when it is determined to initiate the second phase, initiate the second phase of the relocation method comprising the resumption of the processing of the data packets of the flow at the target instance 160 of the first function. Furthermore, the arrangement 100 may be further configured to, when it is determined not to initiate the second phase, initiate a resumption of the processing of the data packets at the source instance 150 of the first function. The arrangement 100 may be configured to initiate the resumption of the processing of the data packets at the source instance 150 of the first function by sending a request to the source instance 150 to abort the relocation and resume the processing of the data packets.

In the first embodiment, the arrangement 100 may be a wireless communication network and the device may be a wireless device. The relocation of the second function may thus be a relocation of a serving base station function from a source base station to a target base station thus comprising a handover of the wireless device from the source base station to the target base station. The relocation may be triggered by a request for the handover received from at least one of the source and the target base stations. Furthermore, the arrangement 100 may be configured to determine whether to initiate the second phase by receiving information from the target base station indicating whether the handover is completed.

The information related to the progress of the relocation of the second function may thus be the information indicating whether the handover is completed. In one embodiment, the arrangement may be configured to determine to initiate the second phase when the information indicates that the handover is completed. Such an embodiment is illustrated in FIG. 6a. In another embodiment, illustrated in FIG. 6b, the arrangement may be configured to determine not to initiate the second phase when the information indicates that the handover has failed.

In the second embodiment, the second function for processing data packets of the flow may be relocated from a first instance to a second instance. The arrangement 100 may be configured to determine whether to initiate the second phase by receiving information from at least one of the first and the second instances indicating whether a first phase of a relocation method for the relocation of the second function is completed. The first phase may comprise stopping the processing of the data packets at the first instance of the second function and preparing resumption of the processing at the second instance of the second function. The arrangement 100 may be configured to determine to initiate the second phase when the information indicates that the first phase of the relocation of the second function is completed. The arrangement 100 may be further configured to determine not to initiate the second phase when the information indicates that the first phase of the relocation of the second function has failed.

In any of the above described embodiments, the arrangement 100 may be configured to initiate the second phase by sending a request to the target instance 160 of the first function to resume the processing of the data packets of the flow. The arrangement 100 may be further configured to initiate the second phase by sending a message to the source instance 150 of the first function releasing the source instance 150 from processing the data packets of the flow.

Furthermore, the arrangement 100 may be configured to initiate the first phase of the relocation method for relocating the first function by sending an instruction to at least one of the source and the target instance of the first function to prepare for the relocation of the first function from the source instance 150 to the target instance 160.

In embodiments of the invention, the arrangement 100 may comprise a processing circuit 101 and a memory 102 as illustrated in FIG. 10a. The arrangement 100 may also comprise an interface circuit 103 configured to communicate with other instances and apparatus either directly or by controlling the communication via another node of the communication network. The memory 102 may contain instructions executable by said processing circuit 101 whereby the arrangement 100 is operative to initiate a first phase of a relocation method for relocating the first function, the first phase comprising stopping the processing of the data packets at the source instance 150 of the first function and preparing resumption of the processing at the target instance 160 of the first function. The first phase is initiated before the relocation of the second function is finalized. The arrangement 100 is further operative to determine whether to initiate a second phase of the relocation method finalizing the relocation of the first function when the first phase is completed. The determining is based on information related to a progress of the relocation of the second function. The arrangement 100 is also operative to, when it is determined to initiate the second phase, initiate the second phase of the relocation method comprising the resumption of the processing of the data packets of the flow at the target instance 160 of the first function.

Figure 10B:
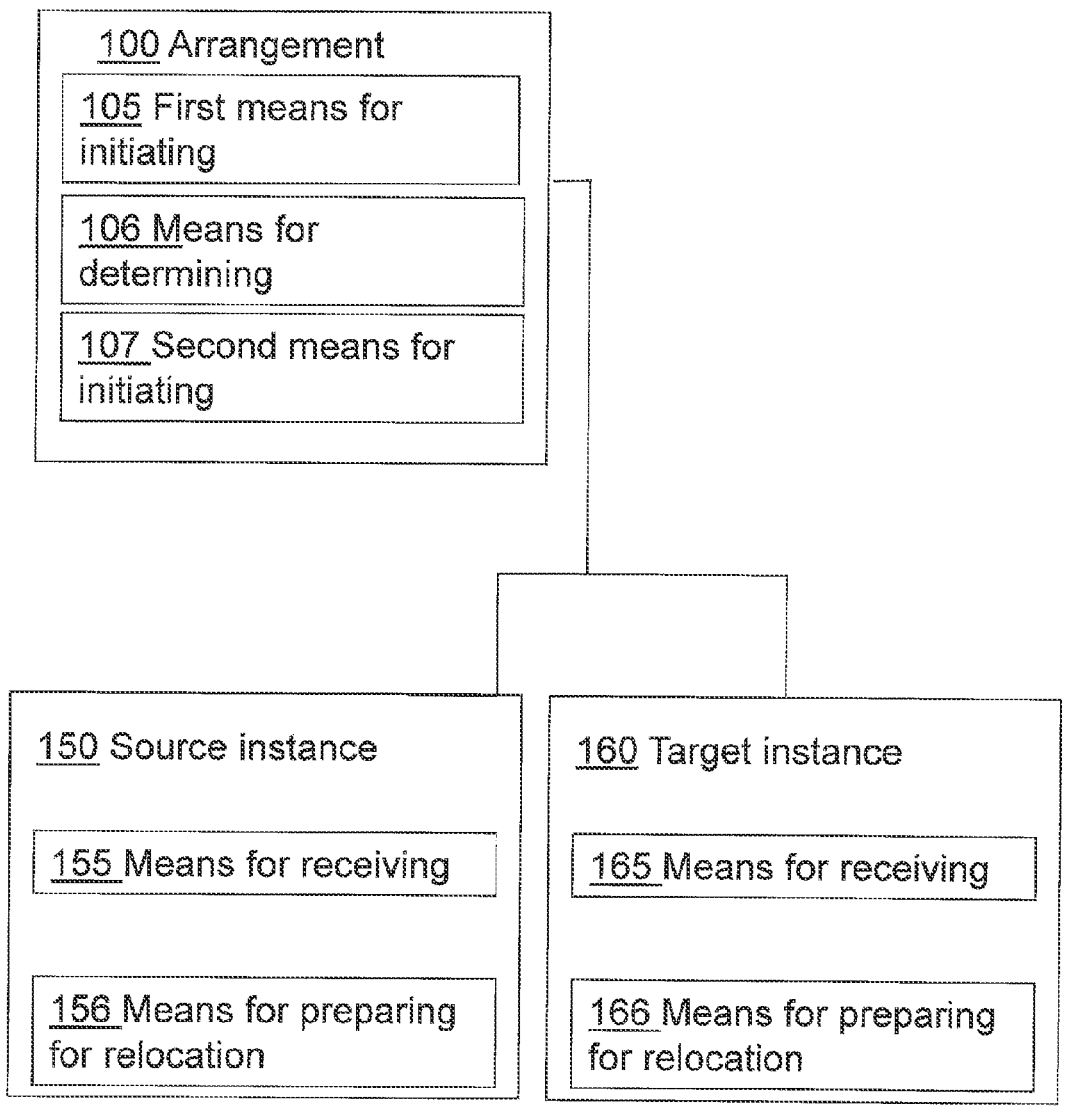

In an alternative way to describe the embodiment in FIG. 10a, illustrated in FIG. 10b, the arrangement 100 may comprise first means for initiating 105 adapted to initiate a first phase of a relocation method for relocating the first function, the first phase comprising stopping the processing of the data packets at the source instance 150 of the first function and preparing resumption of the processing at the target instance 160 of the first function. The first phase is initiated before the relocation of the second function is finalized. The arrangement 100 may also comprise means for determining 106 adapted to determine whether to initiate a second phase of the relocation method finalizing the relocation of the first function when the first phase is completed. The determining is based on information related to a progress of the relocation of the second function. The arrangement 100 may also comprise second means for initiating 107 adapted to initiate the second phase of the relocation method comprising the resumption of the processing of the data packets of the flow at the target instance 160 of the first function, when it is determined to initiate the second phase. The means described are functional units which may be implemented in hardware, software, firmware or any combination thereof. In one embodiment, the means are implemented as a computer program running on a processor.

An embodiment of the source instance 150 for the communication network configured to enable a relocation of a first function for processing data packets of a flow associated with a device from the source instance 150 to the target instance 160 of the communication network is also schematically illustrated in the block diagram in FIG. 10*a*. The source instance 150 is configured to receive an instruction to prepare for the relocation of the first function from the source instance 150 to the target instance 160. The instruction is received from the arrangement 100 controlling the function. The source instance is also configured to prepare for the relocation to the target instance 160 in response to the instruction.

The source instance 150 may be further configured to receive a request from the arrangement 100 to abort the prepared relocation and resume the processing of the data packets. The source instance 150 may also be further configured to receive a request from the arrangement 100 to finalize the prepared relocation, and send a request to the target instance 160 of the first function to resume the processing of the data packets of the flow. The request is sent in response to the request to finalize the prepared relocation.

In any of the embodiments, the source instance 150 may be further configured to prepare for the relocation to the target instance 160 by freezing a state related to the processing of the data packets of the flow, forwarding data packets of the flow to the target instance 160 during the freezing of the state, and transferring the state to the target instance 160, such that the target instance 160 can resume the processing of the data packets of the flow based on the transferred state. The source instance 150 may be further configured to prepare for the relocation to the target instance 160 by copying information elements of the state to the target instance 160 while processing data packets of the flow before freezing the state, and wherein the transfer of the state to the target instance 160 excludes copied information elements that have not been updated as a result of processing the data packets of the flow.

In embodiments of the invention, the source instance 150 may comprise a processing circuit 151 and a memory 152 as illustrated in FIG. 10*a*. The source instance 150 may also comprise an interface circuit 153 configured to communicate with other instances and the arrangement 100 either directly or indirectly. The memory 152 may contain instructions executable by said processing circuit 151 whereby the source instance 150 is operative to receive an instruction to prepare for the relocation of the first function from the source instance 150 to the target instance 160. The instruction is received from the arrangement 100 controlling the function. The source instance 150 is further operative to prepare for the relocation to the target instance 160 in response to the instruction.

In an alternative way to describe the embodiment in FIG. 10*a*, illustrated in FIG. 10*b*, the source instance 150 may comprise means for receiving 155 adapted to receive an instruction to prepare for the relocation of the first function from the source instance 150 to the target instance 160. The instruction is received from the arrangement 100 controlling the function. The source instance 150 may also comprise means for preparing 156 adapted to prepare for the relocation to the target instance 160 in response to the instruction. The means described are functional units which may be implemented in hardware, software, firmware or any combination thereof. In one embodiment, the means are implemented as a computer program running on a processor.

An embodiment of the target instance 160 for a communication network configured to enable a relocation of a first function for processing data packets of a flow associated with a device from the source instance 150 of the communication network to the target instance 160 is also schematically illustrated in the block diagram in FIG. 10*a*. The first function for processing the data packets of the flow is configured to be controlled by the arrangement 100 of the communication network. The target instance 160 is further configured to receive an instruction to prepare for the relocation of the first function from the source instance 150 to the target instance 160. The instruction is received from the arrangement 100 controlling the function. The target instance 160 is further configured to prepare for the relocation in response to the instruction.

The target instance 160 may be further configured to receive a request from the arrangement 100 to abort the prepared relocation. The target instance 160 may also be further configured to receive a request from the source instance 150 of the first function to resume the processing of the data packets of the flow.

The target instance 160 may alternatively be further configured to receive a request from the arrangement 100 to finalize the prepared relocation, and resume the processing of the data packets of the flow in response to the request from the arrangement 100.

In any of the embodiments, the target instance 160 may be configured to prepare for the relocation by receiving data packets of the flow from the source instance 150 for processing at resumption, and receiving a state related to the processing of the data packets from the source instance 150.

In embodiments of the invention, the target instance 160 may comprise a processing circuit 161 and a memory 162 as illustrated in FIG. 10*a*. The target instance 160 may also comprise an interface circuit 163 configured to communicate with other instances and the arrangement 100 either directly or indirectly. The memory 162 may contain instructions executable by said processing circuit 161 whereby the target instance 160 is operative to receive an instruction to prepare for the relocation of the first function from the source instance 150 to the target instance 160. The instruction is received from the arrangement 100 controlling the function. The target instance 160 is further operative to prepare for the relocation in response to the instruction.

In an alternative way to describe the embodiment in FIG. 10*a*, illustrated in FIG. 10*b*, the target instance 160 may comprise means for receiving 165 adapted to receive an instruction to prepare for the relocation of the first function from the source instance 150 to the target instance 160. The instruction is received from the arrangement 100 controlling the function. The target instance 160 may also comprise means for preparing 166 adapted to prepare for the relocation in response to the instruction. The means described are functional units which may be implemented in hardware, software, firmware or any combination thereof. In one embodiment, the means are implemented as a computer program running on a processor.

In still another alternative way to describe the embodiment in FIG. 10*a*, the arrangement 100, the source instance 150, and the target instance 160 may each comprise a Central Processing Unit (CPU) which may be a single unit or a plurality of units. Furthermore, the arrangement 100, the source instance 150, and the target instance 160 may each comprise at least one computer program product (CPP) in the form of a non-volatile memory, e.g. an EEPROM (Electrically Erasable Programmable Read-Only Memory), a flash memory or a disk drive. The CPP may comprise a computer program, which comprises code means which when run on the CPU of the arrangement 100, the source instance 150, and the target instance 160 respectively causes them to perform the methods described earlier in conjunction with FIGS. 7, 8*a-c* and 9*a-c*. In other words, when said code means are run on the CPU, they correspond to the processing circuits 101, 151, 161 in FIG. 10*a*.

The above mentioned and described embodiments are only given as examples and should not be limiting. Other solutions, uses, objectives, and functions within the scope of the accompanying patent claims may be possible.

The invention claimed is:

1. A method for relocating a first function for processing data packets of a flow associated with a device from a source instance to a target instance, the method being performed in a core network node of a communication network controlling the first function, the method being triggered by an initiated handover of the device from a source base station to a target base station, the method comprising:
   initiating a first phase of a relocation method for relocating the first function from the source instance to the target instance, wherein initiating the first phase of the relocation method comprises transmitting to the source instance an instruction for causing the source instance to send a relocation message to the target instance, the relocation message comprising one or more parameters related to the processing of the data packets;
   after transmitting the instruction to the source instance, obtaining an indication that a second phase of the relocation method finalizing the relocation of the first function from the source instance to the target instance is ready to be initiated, wherein obtaining the indication that the second phase is ready to be initiated comprises: i) receiving a first confirmation message transmitted by the target instance indicating that the target instance has received the relocation message from the source instance and is ready to begin processing data packets of the flow and ii) receiving from the target base station a second confirmation message indicating that the handover of the device from the source base station to the target base station is completed; and
   as a result of obtaining the indication that the second phase of the relocation method is ready to be initiated, initiating the second phase of the relocation method, wherein initiating the second phase of the relocation method comprises transmitting to the target instance a message instructing the target instance to begin processing data packets of the flow.

2. The method of claim 1, further comprising initiating a resumption of the processing of the data packets at the source instance of the first function when it is determined not to initiate the second phase.

3. The method of claim 2, wherein initiating the resumption of the processing of the data packets at the source instance of the first function comprises: sending a request to the source instance to abort the relocation and resume the processing of the data packets.

4. The method of claim 1, wherein the communication network is a wireless communication network, and the device is a wireless device.

5. The method of claim 4, wherein the relocation of the second function is a relocation of a serving base station function from a source base station to a target base station thus comprising a handover of the wireless device from the source base station to the target base station, the method being triggered by a request for the handover received from at least one of the source and the target base stations, and wherein determining whether to initiate the second phase comprises: receiving information from the target base station indicating whether the handover is completed.

6. The method of claim 5, wherein it is determined to initiate the second phase when the information indicates that the handover is completed.

7. The method of claim 5, wherein it is determined not to initiate the second phase when the information indicates that the handover has failed.

8. The method of claim 1, wherein the second function for processing data packets of the flow is relocated from a first instance to a second instance, and wherein determining whether to initiate the second phase comprises: receiving information from at least one of the first and the second instances indicating whether a first phase of a relocation method for the relocation of the second function is completed, the first phase comprising stopping the processing of the data packets at the first instance of the second function and preparing resumption of the processing at the second instance of the second function.

9. The method of claim 8, wherein it is determined to initiate the second phase when the information indicates that the first phase of the relocation of the second function is completed.

10. The method of claim 8, wherein it is determined not to initiate the second phase when the information indicates that the first phase of the relocation of the second function has failed.

11. The method of claim 1, wherein initiating the second phase comprises: sending a request to the target instance of the first function to resume the processing of the data packets of the flow.

12. The method of claim 11, wherein initiating the second phase further comprises: sending a message to the source instance of the first function releasing the source instance from processing the data packets of the flow.

13. The method of claim 1, wherein initiating the first phase of the relocation method for relocating the first function comprises: sending an instruction to at least one of the source and the target instance of the first function to prepare for the relocation of the first function from the source instance to the target instance.

14. A computer program product comprising a non-transitory computer readable medium comprising computer readable code which when run on an arrangement causes the arrangement to perform a method as claimed in claim 1.

15. A method for enabling a relocation of a first function for processing data packets of a flow associated with a device from a source instance to a target instance of a communication network, wherein the first function for processing the data packets of the flow is controlled by a core network node of the communication network, wherein the method is performed in the source instance and comprises:
   receiving an instruction to prepare for the relocation of the first function from the source instance to the target instance, the instruction being received from the core network node controlling the function;
   preparing for the relocation of the first function from the source instance to the target instance in response to the instruction, wherein the preparing comprises transmitting to the target instance a message informing the target instance that a first phase of a two phase relocation method for relocating the first function from the source instance to the target instance has been initiated by the core network node;

after receiving the instruction, receiving a first data packet associated with the flow associated with the device; and forwarding to the target instance the first data packet without further processing of the first data packet.

16. The method of claim 15, further comprising:

receiving a request from the arrangement to abort the prepared relocation and resume the processing of the data packets.

17. The method of claim 15, further comprising:

receiving a request from the arrangement to finalize the prepared relocation, and sending a request to the target instance of the first function to resume the processing of the data packets of the flow, the request being sent in response to the request to finalize the prepared relocation.

18. The method of claim 15, wherein preparing for the relocation to the target instance comprises:

freezing a state related to the processing of the data packets of the flow, forwarding data packets of the flow to the target instance during the freezing of the state, transferring the state to the target instance, such that the target instance can resume the processing of the data packets of the flow based on the transferred state.

19. The method of claim 18, wherein preparing for the relocation to the target instance further comprises before freezing the state: copying information elements of the state to the target instance while processing data packets of the flow, and wherein the transfer of the state to the target instance excludes copied information elements that have not been updated as a result of processing the data packets of the flow.

20. A computer program product comprising a non-transitory computer readable medium comprising computer readable code which when run on a source instance causes the source instance to perform a method as claimed in claim 15.

21. A method for enabling a relocation of a first function for processing data packets of a flow associated with a device from a source instance to a target instance of a communication network, wherein the first function for processing the data packets of the flow is controlled by core network node of the communication network, wherein the method is performed in the target instance and comprises:

receiving a relocation message informing the target instance that a first phase of a two phase relocation method for relocating the first function from the source instance to the target instance has been initiated by the core network node, the message being sent by source instance;

transmitting to the core network node a confirmation message indicating that the target instance has received the relocation message from the source instance and is ready to begin processing data packets of the flow; and after transmitting the confirmation message to the core network node, receiving from the core network node a message instructing the target instance to begin processing data packets of the flow.

22. The method of claim 21, further comprising: receiving a request from the arrangement to abort the prepared relocation.

23. The target instance of claim 22, configured to prepare for the relocation by:

receiving data packets of the flow from the source instance for processing at resumption, and receiving a state related to the processing of the data packets from the source instance.

24. The method of claim 21, further comprising:

receiving a request from the source instance of the first function to resume the processing of the data packets of the flow, and resuming the processing of the data packets of the flow in response to the request from the source instance.

25. The method of claim 21, further comprising:

receiving a request from the arrangement to finalize the prepared relocation, and resuming the processing of the data packets of the flow in response to the request from the arrangement.

26. The method of claim 21, wherein preparing for the relocation comprises:

receiving data packets of the flow from the source instance for processing at resumption, receiving a state related to the processing of the data packets from the source instance.

27. A computer program product comprising a non-transitory computer readable medium comprising computer readable code which when run on a target instance causes the target instance to perform a method as claimed in claim 21.

28. A core network node configured to control a first function for processing data packets of a flow associated with a device, the node being configured to relocate the first function from a source instance to a target instance, the relocation being triggered by an initiated handover of the device from a source base station to a target base station, the node being further configured to:

initiate a first phase of a relocation method for relocating the first function from the source instance to the target instance, wherein initiating the first phase of the relocation method comprises transmitting to the source instance an instruction for causing the source instance to send a relocation message to the target instance, the relocation message comprising one or more parameters relating to the processing of the data packets, after transmitting the instruction to the source instance, obtain an indication that a second phase of the relocation method finalizing the relocation of the first function from the source instance to the target instance is ready to be initiated, wherein obtaining the indication that the second phase is ready to be initiated comprises: i) receiving a first confirmation message transmitted by the target instance indicating that the target instance has received the relocation message from the source instance and is ready to begin processing data packets of the flow and ii) receiving from the target base station a second confirmation message indicating that the handover of the device from the source base station to the target base station is completed; and as a result of obtaining the indication that the second phase of the relocation method is ready to be initiated, initiate the second phase of the relocation method, wherein initiating the second phase of the relocation method comprises transmitting to the target instance a message instructing the target instance to begin processing data packets of the flow.

29. The node of claim 28, further configured to, when it is determined not to initiate the second phase: initiate a resumption of the processing of the data packets at the source instance of the first function.

30. The node of claim 29, configured to initiate the resumption of the processing of the data packets at the source instance of the first function by: sending a request to the source instance to abort the relocation and resume the processing of the data packets.

31. The node of claim 28, wherein the communication network is a wireless communication network and the device is a wireless device.

32. The node of claim 31, wherein the relocation of the second function is a relocation of a serving base station function from a source base station to a target base station thus comprising a handover of the wireless device from the source base station to the target base station, the relocation being triggered by a request for the handover received from at least one of the source and the target base stations, and wherein the arrangement is configured to determine whether to initiate the second phase by: receiving information from the target base station indicating whether the handover is completed.

33. The node of claim 32, configured to determine to initiate the second phase when the information indicates that the handover is completed.

34. The node of claim 32, configured to determine not to initiate the second phase when the information indicates that the handover has failed.

35. The node of claim 28, wherein the second function for processing data packets of the flow is relocated from a first instance to a second instance, the arrangement being configured to determine whether to initiate the second phase by:
receiving information from at least one of the first and the second instances indicating whether a first phase of a relocation method for the relocation of the second function is completed, the first phase comprising stopping the processing of the data packets at the first instance of the second function and preparing resumption of the processing at the second instance of the second function.

36. The node of claim 35, configured to determine to initiate the second phase when the information indicates that the first phase of the relocation of the second function is completed.

37. The node of claim 35, configured to determine not to initiate the second phase when the information indicates that the first phase of the relocation of the second function has failed.

38. The node of claim 28, configured to initiate the second phase by: sending a request to the target instance of the first function to resume the processing of the data packets of the flow.

39. The node of claim 38, further configured to initiate the second phase by: sending a message to the source instance of the first function releasing the source instance from processing the data packets of the flow.

40. The node of claim 28, configured to initiate the first phase of the relocation method for relocating the first function by: sending an instruction to at least one of the source and the target instance of the first function to prepare for the relocation of the first function from the source instance to the target instance.

41. A source instance for a communication network configured to enable a relocation of a first function for processing data packets of a flow associated with a device from the source instance to a target instance of the communication network, wherein the first function for processing the data packets of the flow is configured to be controlled by a core network node of the communication network, wherein the source instance is configured to:
receive an instruction to prepare for the relocation of the first function from the source instance to the target instance, the instruction being received from the arrangement core node controlling the function;
prepare for the relocation of the first function from the source instance to the target instance in response to the instruction, wherein the preparing comprises transmitting to the target instance a message informing the target instance that a first phase of a two phase relocation method for relocating the first function from the source instance to the target instance has been initiated by the core network node;
after receiving the instruction, receive a first data packet associated with the flow associated with the device; and
forward to the target instance the first data packet without further processing of the first data packet.

42. The source instance of claim 41, further configured to: receive a request from the arrangement to abort the prepared relocation and resume the processing of the data packets.

43. The source instance of claim 41, further configured to:
receive a request from the arrangement to finalize the prepared relocation, and
send a request to the target instance of the first function to resume the processing of the data packets of the flow, the request being sent in response to the request to finalize the prepared relocation.

44. The source instance of claim 41, configured to prepare for the relocation to the target instance by:
freezing a state related to the processing of the data packets of the flow,
forwarding data packets of the flow to the target instance during the freezing of the state, and
transferring the state to the target instance, such that the target instance can resume the processing of the data packets of the flow based on the transferred state.

45. The source instance of claim 44, configured to prepare for the relocation to the target instance by: copying information elements of the state to the target instance while processing data packets of the flow before freezing the state, and wherein the transfer of the state to the target instance excludes copied information elements that have not been updated as a result of processing the data packets of the flow.

46. A target instance for a communication network configured to enable a relocation of a first function for processing data packets of a flow associated with a device from a source instance of the communication network to the target instance, wherein the first function for processing the data packets of the flow is configured to be controlled by a core network node of the communication network, wherein the target instance is further configured to:
receive a relocation message informing the target instance that a first phase of a two phase relocation method for relocating the first function from the source instance to the target instance has been initiated by the core network node, the message being sent by the source instance;
transmit to the core network node a confirmation message indicating that the target instance has received the relocation message from the source instance and is ready to begin processing data packets of the flow; and
after transmitting the confirmation message to the core network node, receive from the core network node a message instructing the target instance to begin processing data packets of the flow.

47. The target instance of claim 46, further configured to: receive a request from the arrangement to abort the prepared relocation.

48. The target instance of claim 46, further configured to: receive a request from the source instance of the first function to resume the processing of the data packets of the flow.

49. The target instance of claim 46, further configured to:
receive a request from the arrangement to finalize the prepared relocation, and
resume the processing of the data packets of the flow in response to the request from the arrangement.

* * * * *